US009567432B2

(12) United States Patent
Olsson et al.

(10) Patent No.: US 9,567,432 B2
(45) Date of Patent: Feb. 14, 2017

(54) LIGNIN POLY(LACTIC ACID) COPOLYMERS

(71) Applicant: The Board of Trustees of the Leland Stanford Junior University, Palo Alto, CA (US)

(72) Inventors: Johan Vilhelm Olsson, Palo Alto, CA (US); Yi-Lin Chung, Palo Alto, CA (US); Russell Jingxian Li, Palo Alto, CA (US); Robert Waymouth, Palo Alto, CA (US); Elizabeth Sattely, Palo Alto, CA (US); Sarah Billington, Palo Alto, CA (US); Curtis W. Frank, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 209 days.

(21) Appl. No.: 13/975,101

(22) Filed: Aug. 23, 2013

(65) Prior Publication Data
US 2014/0080992 A1    Mar. 20, 2014

Related U.S. Application Data

(60) Provisional application No. 61/702,193, filed on Sep. 17, 2012.

(51) Int. Cl.
*C08G 63/78*    (2006.01)
*C08G 63/91*    (2006.01)
(Continued)

(52) U.S. Cl.
CPC ............... *C08G 63/91* (2013.01); *C08G 63/08* (2013.01); *C08G 63/78* (2013.01); *C08H 6/00* (2013.01)

(58) Field of Classification Search
None
See application file for complete search history.

(56) References Cited

U.S. PATENT DOCUMENTS 3,519,581 A * 7/1970 Dougherty ......... C08G 18/6492
527/401
5,382,609 A * 1/1995 Lock ..................... D04H 1/42
156/283

(Continued)

FOREIGN PATENT DOCUMENTS

EP    2 365 016 A1    9/2011
JP    2007-00627 A    1/2007
JP    2008-274068     11/2008

OTHER PUBLICATIONS

Biorenewable Precursor Fibers Formed from Blending Polylactic Acid, Butyrated Lignin, and Grafted Lignin by Angus, Edward J. , from the Wind Engergy Science, Engineering and Policy NSF Research Experiences for Undergraduates Symposium Proceedings, Aug. 8, 2012.*

(Continued)

*Primary Examiner* — Peter A Salamon
(74) *Attorney, Agent, or Firm* — Foley & Lardner LLP; Cliff Z. Liu

(57) ABSTRACT

Provided herein are graft co-polymers of lignin and poly (lactic acid) (lignin-g-PLA copolymer), thermoset and thermoplastic polymers including them, methods of preparing these polymers, and articles of manufacture including such polymers.

19 Claims, 20 Drawing Sheets

(51) Int. Cl.
*C08G 63/08* (2006.01)
*C08H 6/00* (2010.01)
*C08B 37/00* (2006.01)
*C08H 7/00* (2011.01)

(56) References Cited

U.S. PATENT DOCUMENTS

| | | | | |
|---|---|---|---|---|
| 5,997,784 | A * | 12/1999 | Karnoski | B29C 44/22 264/101 |
| 6,284,838 | B1 * | 9/2001 | Silbiger | C08L 89/00 524/13 |
| 6,509,397 | B1 * | 1/2003 | Nagele | C08L 1/12 524/29 |
| 8,101,112 | B2 * | 1/2012 | Hashiba | B29C 45/0001 264/328.14 |
| 8,383,784 | B2 * | 2/2013 | Park | C07G 1/00 530/500 |
| 8,772,406 | B2 * | 7/2014 | Linhardt | A01N 25/00 524/172 |
| 2006/0151079 | A1 * | 7/2006 | Weydert | B29C 33/52 152/209.18 |
| 2008/0118765 | A1 * | 5/2008 | Dorgan | B82Y 30/00 428/532 |
| 2009/0118765 | A1 * | 5/2009 | Mueller | A61F 2/44 606/246 |
| 2009/0198007 | A1 * | 8/2009 | Wang | C08K 3/08 524/423 |
| 2011/0319509 | A1 * | 12/2011 | Dorgan | C08G 63/08 521/81 |
| 2012/0046437 | A1 | 2/2012 | Coady et al. | |
| 2013/0281582 | A1 * | 10/2013 | Dorgan | C08L 97/005 524/73 |

OTHER PUBLICATIONS

Ring Opening Polymerization of L-Lactide Catalyzed by an Organocatalytic System Combining Acids and Basic Sites by Kadota et al. , Macromolecules, 2010, 43, 8874-8879, Oct. 8, 2010.*

Acyclic Guanidine as Organic Catalysts for Living Polymerization of Lactide by Zhang et al., Macromolecules 2010, 43, 1660-1664, Jan. 5, 2010.*

The Reaction Mechanism for Organocatalytic Ring Opening Polymerization of L Lactide using a Guaniding Based Catalyst, Chuma et al, JACS, J.Am. Chem. Society, 20008, 130, 6749-6754, May 3, 2008.*

Acyclic Guanidines as organic Catalysts for Living Polymerization of Lactide, Zhang et al. Macromolecules 2010, 43, 1660-1664, Jan. 5, 2010.*

Acyclic Guanidines as organic Catalysts for Living Polymerization of Lactide, Zhang et al., Macromolecules 2010, 43, 1660-1664, Jan. 5, 2010.*

Angus, "Analysis of Biorenewable Precursor Fibers Formed From Blending Polylactic Acid, Butyrated Lignin, and Grafted Lignin", Wind Energy Science, Engineering and Policy, Symposium Proceedings, pp. 6-1 to 6-13, (2012).

Chung, et al., "A renewable Lignin—Lactide copolymer and application in Biobased composites", ACS sustainable Chemistry & Engineering,vol. 1, pp. 1232-1238, (2013).

International Search Report for PCT/US2013/056489 dated Nov. 12, 2013.

Li, et al., "Thermal and machnical properites of biodegradable blends of poly(L-lactic acid) and lignin", Polymer International, 52: 949-955, (2003).

Harris, et al., "Investigation: A Copolymer of Lignin and Poly (Lactide)," (2011), Retrieved from the University of Minnesota Digital Conservancy, http://purl.umn.edu/117447, on Jun. 17, 2012.

Eyser, M.P. et al. (2011) "Synthesis of Novel Polylactide-Graft-Lignin Compolymers," Retrieved from Polymer Preprints, Division of Polymer Chemistry, http://pubs.acs.org/cgi-bin/preprints/display?div=poly&meet=241&page=68736_acs_preprint_on_lignin_eyser_perbix_2_.pdf, on Apr. 4, 2016.

Supplementary European Search Report for European Application No. 13837856.7, mailed Apr. 15, 2016.

* cited by examiner

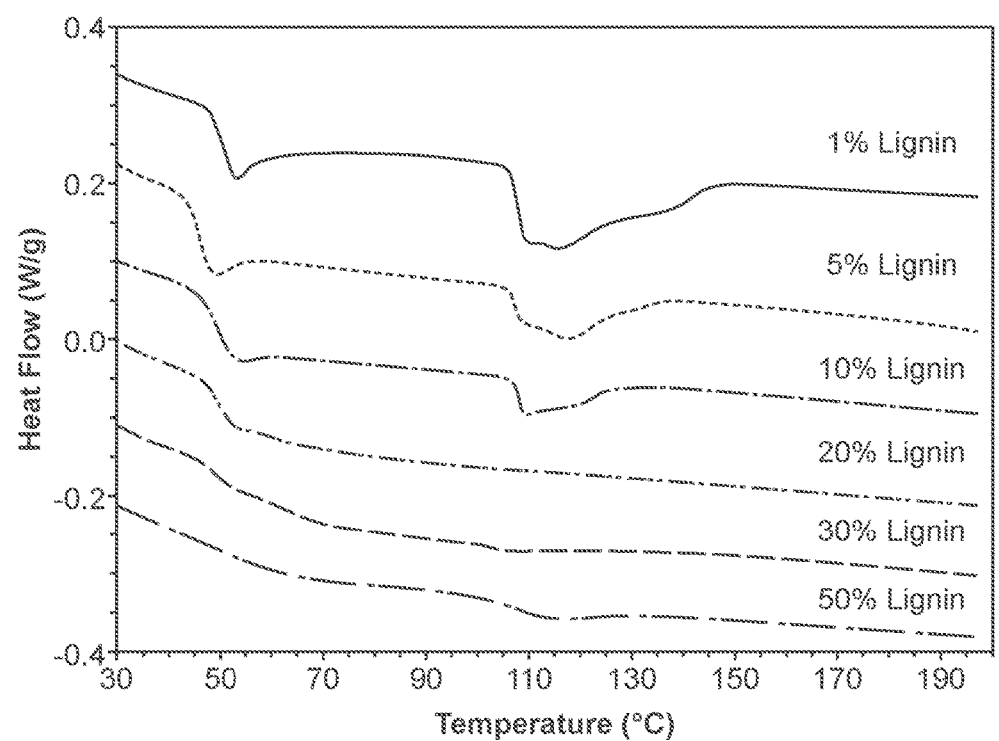
FIG. 11 (Cont. 1)

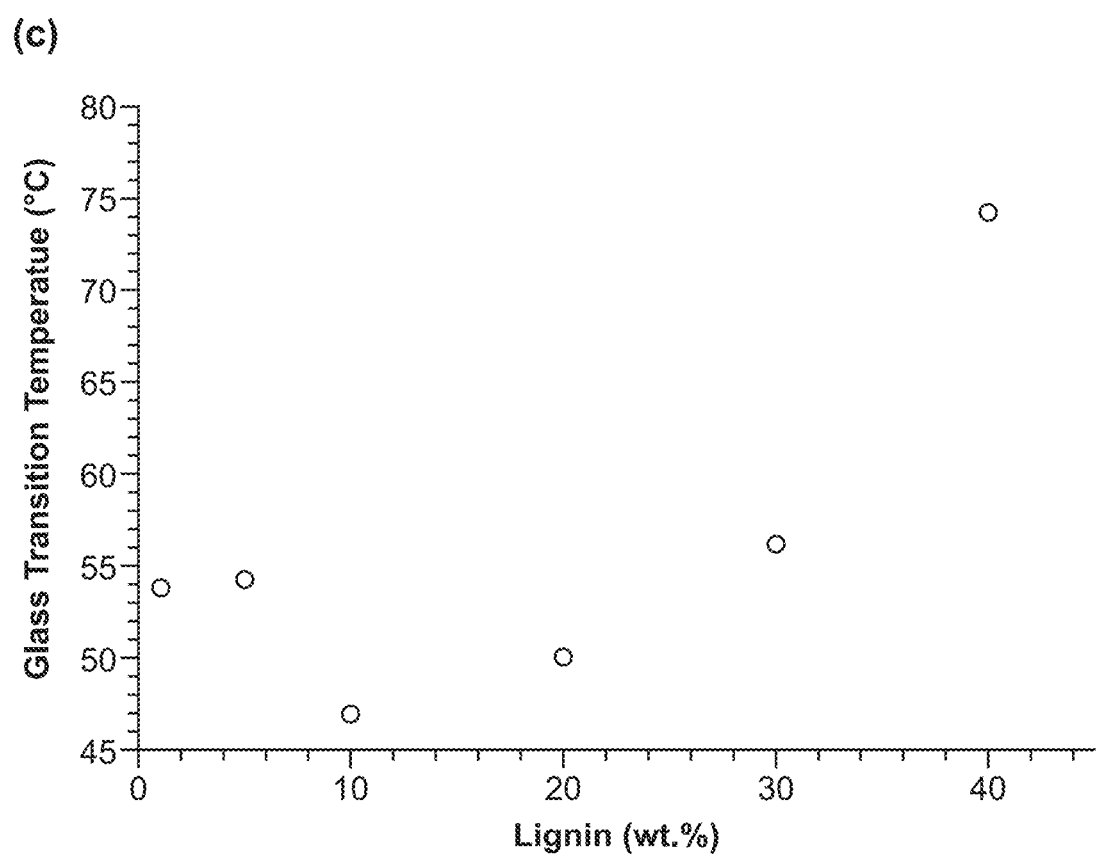
FIG. 11 (Cont. 2)

LIGNIN POLY(LACTIC ACID) COPOLYMERS

CROSS REFERENCE TO RELATED APPLICATION

This application claims priority under 35 U.S.C. §119(e) to U.S. Provisional Application No. 61/702,193 filed on Sep. 17, 2012, which is incorporated herein in its entirety by reference.

STATEMENT REGARDING FEDERALLY SPONSORED RESEARCH OR DEVELOPMENT

This invention was made with Government support under contract DE-SC0005430 awarded by the Department of Energy and under contract 0900325 awarded by the National Science Foundation. The Government has certain rights in this invention.

FIELD OF THE INVENTION

This invention relates to graft polymers comprising lignin and poly(lactic acid) (lignin-g-PLA copolymer), thermoset and thermoplastic polymers including them, methods of preparing these polymers, and articles of manufacture including such polymers.

STATE OF THE ART

Poly(lactic acid) (PLA) is a commercial bio-based thermoplastic material, used e.g. in food packaging, textiles, and biomedical applications. The main limitations of commercial PLA are its high price of production and limited application scope, mostly because of poor mechanical performance.

Lignin is an inexpensive and currently underutilized waste product from papermaking and biorefinery industries. Lignin is the second most abundant renewable resource in nature. Structurally, it contains, inter alia, substituted phenyl rings, and phenolic and aliphatic hydroxy groups. It is often relegated to the low-value use of combustion, or sold as a natural component of animal feeds. A small portion of lignin is used as inexpensive structural fillers, surfactants, additives in materials applications, and as bio-composite materials for improving the material properties of water resistance, stiffness, and crystallinity. Thus, finding new ways for producing value-added products from lignin would provide additional revenues for papermaking and biorefinery industries. A limiting factor for use of lignin as a filler in composite materials is its poor miscibility with most thermoplastic polymers.

Furthermore, most of the current lignin structural modification and lactide ring-opening polymerization reactions use metal-based catalysts. The presence of metals in the final products is potentially harmful to human health, which limits its application. The residual metals also pollute the environment, for example, as a result of increased concentration of such accumulated metals in the landfills and groundwater.

SUMMARY

Aspects and embodiments of this invention address economic and environmental downsides of lignin waste handling, and cost-effective production of new, high-performance, bio-based materials with a broad range of potential applications. Certain aspects and embodiments of this invention arise in part out of the surprising discovery that a simple metal-free and solvent-free method for graft polymerization of lactides with lignin provides lignin-g-PLA copolymers. Lignin-g-PLA copolymers provided herein have controllable PLA chain lengths. In some embodiments, the PLA-chain length is controlled by varying one or more of lignin/lactide ratio and pre-acylation such as pre-acetylation of the lignin. The lignin is grafted with the PLA via ring-opening polymerization of lactides. In some embodiment, the copolymers comprise preferential grafting on lignin aliphatic hydroxyls over phenolic hydroxyls. The ability to control the chain lengths of the grafted PLA enables variable levels of interaction with a surrounding polymer matrix, allowing properties of the composite materials to be tuned.

In some embodiments, the lignin-g-PLA copolymers are insoluble in methanol and are soluble, for example, in tetrahydrofuran (THF), at 5-6 g/mL, and in $CHCl_3$. Lignin alone, i.e. lignin not grafted with PLA, does not dissolve substantially in THF. The PLA residues grafted on to lignin make the lignin-containing copolymer soluble in THF.

The grafted polymers are contemplated to be utilized as modifiers for improving end-use performance of PLA as well as other commercial thermoplastic materials. In certain aspects, the technology also includes the production of bio-based thermoset materials from the lignin-g-PLA co-polymers by curing with cross-linkers (e.g. di-isocyanates (such as hexamethylene diisocyanate), di-epoxides (such as bisphenol A diglycidyl ether) or polyanhydrides (such as poly(maleic anhydride-alt-1-octadecene)). The ability to control the grafted PLA chain lengths and the degree of chain extension/cross-linking offers access to a broad spectrum of materials ranging from thermoplastics to thermosets.

Certain non-limiting examples of advantages of certain aspects and embodiments of this invention include one or more of the following:

The synthetic method for grafting lignin with PLA by ring-opening polymerization of lactide does not require toxic metal catalysts. The organic base employed in certain aspects and embodiments of this invention is an organocatalyst and does not contain any toxic metals. Therefore, certain aspects and embodiments of this invention provide a potentially safer and more environmentally benign and biocompatible product.

The polymerization proceeds under solvent-free reaction conditions.

The method utilizes lignin, a low value waste material that may increase the cost efficiency of the material production and also provide additional revenue for the biorefinery, papermaking, and agriculture industries.

New bio-based thermoset materials with tunable properties can be synthesized by in-situ cross-linking of the lignin-g-PLA co-polymers directly from the crude polymerization melt.

The grafted PLA chain-length can be controlled by employing varying lignin weight ratio and lignin source such as acylated lignin.

The lignin-g-PLA co-polymers display increased glass transition temperature (Tg) with increasing lignin content. The lignin-g-PLA co-polymers have better dispersion with PLA materials, and are contemplated to form blends with other thermoplastics. In other words, by adjusting the chain length of the PLA chains grafted onto lignin, the interaction with blended polymer matrices can be controlled to give rise to a variety of different material properties.

The structure and properties of the lignin-g-PLA can be tuned by changing the stereoforms (L, D, or DL) of lactides and by utilizing different lignin sources.

The composite materials containing miscible PLA-modified lignin have improved UV absorption, and are efficient blockers of UV radiation.

In various embodiments, this invention also contemplates the use of co-monomers other than a lactide. Such other co-monomers include, without limitation, caprolactone (CL) or other cyclic lactone and carbonate monomers (such as valerolactones and trimethylene carbonate), which in some embodiments are contemplated to be co-polymerized using the same catalytic polymerization system as provided herein. In various embodiments of this invention, a broad variety of organic bases are useful as the ring opening catalyst. In various embodiments, the lignin-g-PLA copolymers of certain aspects and embodiments of this invention are also contemplated to be modifiers for other thermoplastics, such as poly(hydroxyalkanoates) (PHAs), poly(caprolactone) (PCL), or poly(ethylene terephthalate) (PET). In various other embodiments, this technology provides thermoset polymers including lignin grafted block- or random co-polymers with other monomers such as CL prior to crosslinking, which enables the hard/soft behavior of the final materials to be altered.

These and other aspects and embodiments of this invention are illustrated and described herein below.

BRIEF DESCRIPTION OF THE FIGURES

FIGS. 9(a) and 10(a) provide gel permeation chromatograms (GPC) of crude lignin-g-PLA copolymers, and 9(b) and 10(b) provide gel permeation chromatograms of pure lignin-g-PLA copolymers of certain aspects and embodiments of this invention. The eluting solvents for FIGS. 9(a-b)/FIG. 10(a) and FIG. 10(b) are THF and chloroform, respectively.

DETAILED DESCRIPTION OF THE INVENTION

Figure 1:
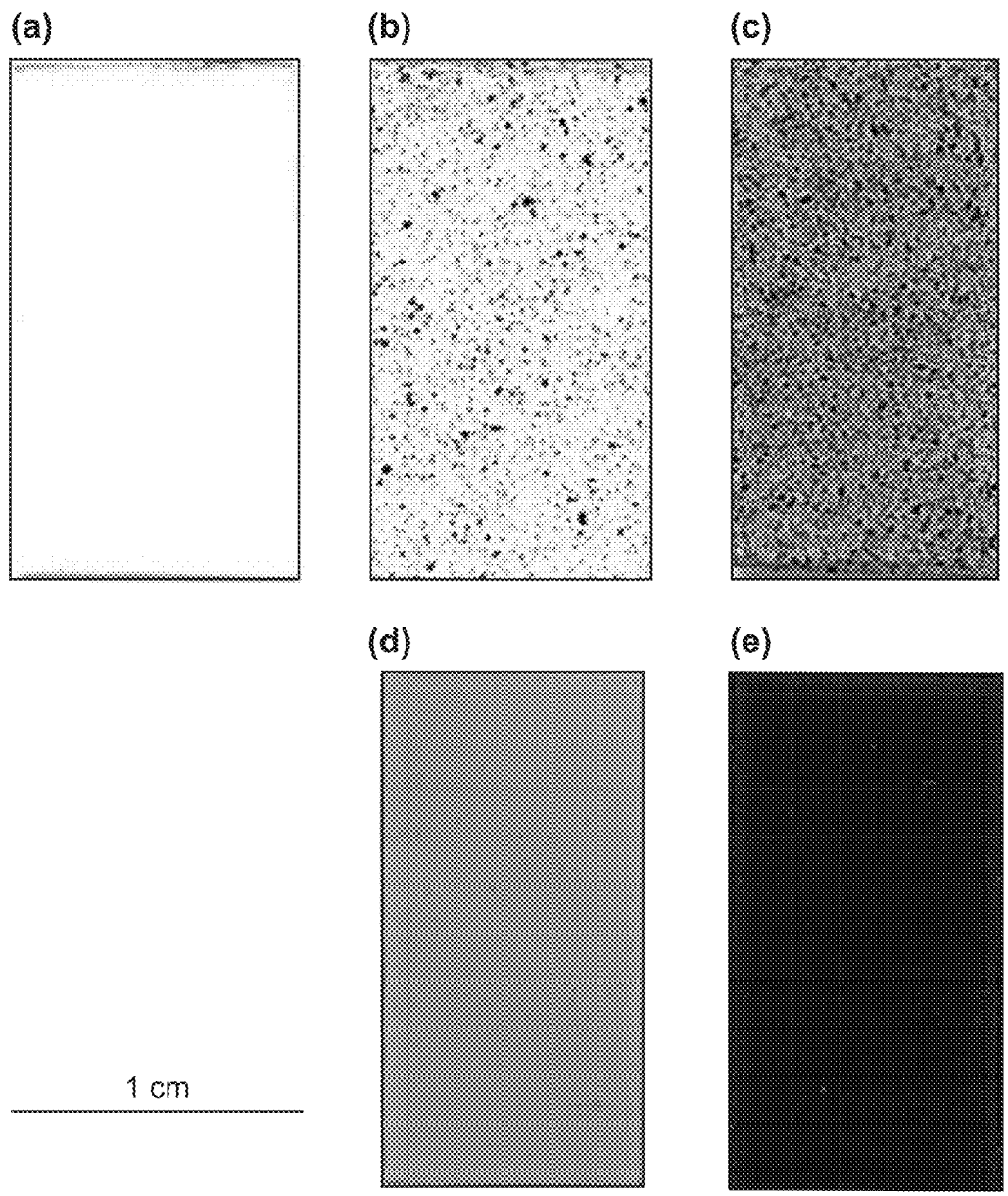
FIGS. 1(a-e) provide images of PLA-lignin composites showing increased dispersion of lignin in composites made from lignin-g-PLA copolymer compared to those made with unmodified lignin: (a) PLA, (b) PLA1L, (c) PLA5L, (d) PLA1C, and (e) PLA5C. The lignin contents for (b)/(d) and (c)/(e) are 0.9-1.0 wt. % and 4.4-4.8 wt. %, respectively. PLA1L and PLA5L refer to PLA-lignin composites with unmodified lignin and lignin-g-PLA copolymers. PLA1C and PLA5C refer to PLA-lignin composites with lignin-g-PLA copolymers. See also, Table 6.
Figure 2:
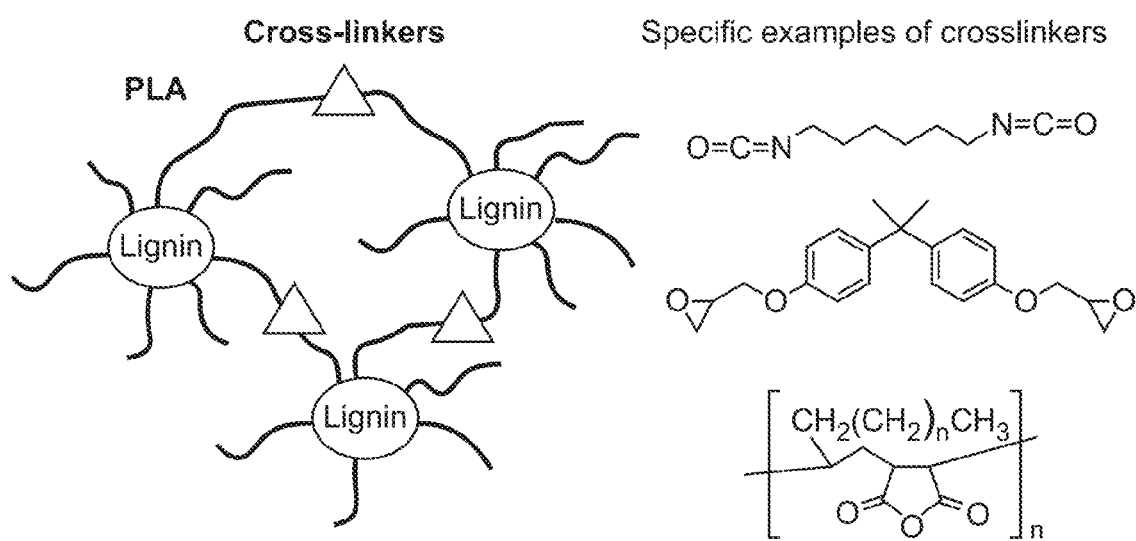
FIG. 2 is a schematic diagram of a thermoset polymer of an embodiment of this invention including lignin-g-PLA copolymers cross-linked with a cross-linker.

In various aspects and embodiments, this invention relates, e.g., to composition and methods related to lignin-g-PLA copolymers. Before describing certain aspects and embodiments of this invention further, the following terms are defined.

Definitions

It must be noted that as used herein and in the appended claims, the singular forms "a" "an", and "the" include plural referents unless the context clearly dictates otherwise. Thus, for example, reference to "a solvent" includes a plurality of such solvents.

As used herein, the term "comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a composition or process consisting essentially of the elements as defined herein would not exclude other materials or steps that do not materially affect the basic and novel characteristic(s) of the claimed invention. "Consisting of" shall mean excluding more than trace elements of other ingredients and substantial method steps. Embodiments defined by each of these transition terms are within the scope of this invention.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques. For example, in certain situations, the term "about" when used before a numerical designation, e.g., temperature, time, amount, and concentration, including range, indicates approximations which may vary by (+) or (−) 10%, 5% or 1%.

"Alkoxy" refers to the group —O-alkyl. Non-limiting examples include, methoxy, ethoxy, propoxy, isopropoxy, butoxy, and tertiary butoxy.

"Alkyl" refers to a monovalent, aliphatic hydrocarbon radical. Non-limiting examples include, methyl, ethyl, propyl, isopropyl, butyl, and tertiary butyl.

"Alkylene" refers to a divalent aliphatic hydrocarbon radical. Non-limiting examples include, methylene, ethylene, propylene, isopropylene, butylene, and pentylene.

"Graft copolymer" refers to a branched copolymer in which the side chains are structurally distinct from the main chain.

"Guanidine derivative" refers to a strongly basic and preferably poorly nucleophilic base having the guanidine nitrogen atoms, preferably where the nitrogen atoms are joined with each other, as will be apparent to the skilled artisan, via alkylene linkers.

"Heteroalkylene" refers to an alkylene group where one or more, preferably up to 10, carbon atoms are replaced with an —O—, —S—, or an —N($R_y$)— group where y is hydrogen, $C_1$-$C_6$ alkyl, or an amide or a carbamate of the —NH— group. Non-limiting examples include, —$CH_2$—$CH_2$—O—$CH_2$—$CH_2$—, —$CH_2$—$CH_2$—S—$CH_2$—$CH_2$—, —$CH_2$—$CH_2$—NH—$CH_2$—$CH_2$—, —$CH_2$—$CH_2$—NMe-$CH_2$—$CH_2$-, and —$CH_2$—$CH_2$—N(COMe)-$CH_2$—$CH_2$—.

"Lactide" refers to a cyclic diester of lactic acid which can have a D, an L, or a DL configuration.

"Lewis acid metal catalyst" refers to a metal catalyst that is capable of accepting lone electron pairs, and are preferably useful in ring opening polymerization of lactides. Non-limiting examples of catalysts include Sn (II) salts such as stannous octanoate.

"Organic base" refers preferably to a nitrogen-containing base, and more preferably a guanidine derivative or a nucleophilic base such as pyridine or dialkylaminopyridines (such as 4-N,N-dimethylaminopyridine).

"$C_x$" when used with a group refers to x carbon atoms in that group.

"Thermoset polymer" refers to a polymer that is cross-linked irreversibly. It can be cured by heating, through a chemical reaction, by irradiation such as electron beam processing, and a combination of two or more thereof. It typically cannot be deformed by heating.

"Thermoplastic polymer" refers to a polymer that becomes pliable or moldable above a specific temperature, and returns to a solid state upon cooling. Thermoplastic polymers typically have a high molecular weight, whose chains can associate, e.g., through intermolecular forces; this property allows thermoplastics to be remolded because the intermolecular interactions spontaneously reform upon cooling. In this way, thermoplastics differ from thermosetting polymers, which form irreversible chemical bonds during the curing process.

Descriptive Embodiments

In one aspect, this invention provides a process of preparing a graft polymer of lignin and polylactic acid) (lignin-g-PLA copolymer), the process comprising reacting a lignin with a lactide and/or another co-monomer, and an organic base to provide the lignin-g-PLA copolymer. In one embodiment, the process is performed in the absence of a Lewis acid metal catalyst. As used herein lignin includes neat or un-modified lignin and pretreated or acylated lignin as described herein below.

In another embodiment, the organic base is a guanidine derivative. In another embodiment, the organic base is of formula:

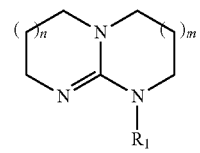

wherein
m is 0, 1, 2, or 3; n is 0, 1, 2, or 3; and $R_1$ is hydrogen or is $C_1$-$C_6$ alkyl optionally substituted with 1-3 hydroxy, aryl, $C_1$-$C_6$ alkoxy groups.

In another embodiment, $R_1$ is hydrogen. In another embodiment, $R_1$ is $C_1$-$C_6$ alkyl optionally substituted with 1-3 hydroxy, aryl, $C_1$-$C_6$ alkoxy groups. In another embodiment, the organic base is triazabicyclodecene (TBD):

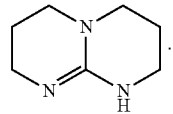

In another embodiment, the lactide is D-lactide, L-lactide, DL-lactide, or a mixture of 2 or more thereof.

In another embodiment, the process is performed at about 100° C. to about 140° C., such as at about 120° C.

In another embodiment, the another co-monomer is epsilon-caprolactone, delta/gamma-valerolactone, or trimethylene carbonate.

In another embodiment, the process further comprises reacting the lignin-g-PLA copolymer with a cross-linker to provide a thermoset polymer. In another embodiment, the cross-linker is of formula OCN-L-NCO, wherein L is a $C_2$-$C_{20}$ alkylene or heteroalkylene optionally substituted with 1-5 $C_1$-$C_6$ alkyl groups. L can also be or contain aromatic rings. In another embodiment, L is $C_2$-$C_{20}$ alkylene. In another embodiment, L is $C_2$-$C_{20}$ heteroalkylene. In another embodiment, L is —$(CH_2)_6$—.

In another aspect, provided herein are lignin-g-PLA copolymers. In another embodiment, the lignin-g-PLA copolymer provided herein comprises by weight about 1% to about 50%, about 5% to about 45%, about 10% to about 40%, about 15% to about 35%, about 20% to about 30%, or about 25% lignin. In another embodiment, the lignin-g-PLA copolymer provided herein comprises by weight about 1% to about 10%, about 11% to about 20%, about 21% to about 30%, about 31% to about 40%, or about 41% to about 50% lignin. In certain embodiments, the rest of the lignin-g-PLA copolymer is the PLA portion.

In another embodiment, the lignin-g-PLA copolymer has a number average molecular weight of about 1000 to about 100,000 or about 10,000 to about 100,000. Unless otherwise mentioned, all molecular weights shown are in Daltons (Da). In another embodiment, the PLA chain length on lignin-g-PLA copolymers has a degree of polymerization of about 2 to about 240.

In some embodiments, the lignin is neat lignin, lignin waste, or pretreated lignin. Non-limiting examples of pretreated lignin includes acylated lignin such as partially acetylated lignin.

In some embodiments, the number-average molecular weight ($M_n$) of each grafting PLA chain is about 200-about 11,000, about 300-about 10,000, about 400-about 9,000, about 500-about 8,000, about 600-about 7,000, about 700-about 6,000, about 1,000-about 5,000, about 2,000-about 4,000, about 3000-about 4000, or about 3500. In some embodiments, the lignin-g-PLA copolymer contains about 0.15-about 1.10 mmole/g or about 0.4-about 0.7 mmole/g aliphatic hydroxy groups. In some embodiments, the lignin-g-PLA copolymer contains about 0.01-about 1 mmole/g or about 0.1-about 0.7 mmole/g phenolic hydroxy groups. In some embodiments, the lignin-g-PLA copolymer contains about 0.2-about 2 mmole/g or about 1 mmole/g hydroxy groups. In some embodiments, the lignin-g-PLA copolymer contains about 0.05 about 0.1 mmole/g or about 0.08 mmole/g —COOH groups.

In some embodiments, the lignin-g-PLA copolymer provided herein comprises acylated lignin. Acylated lignin, as used herein, refers to lignin where at least a part of the hydroxy groups are acylated. Acylated, as used herein, refers to replacing the hydrogen atom in a hydroxy group with a —COR$^x$ group, where R$^x$ is a $C_1$-$C_{10}$ hydrocarbyl group optionally substituted with 1-3 heteroatom containing groups, wherein the heteroatoms are one or more of N, O, and S. In some embodiments, the hydrocarbyl group is an alkyl, aryl, or heteroaryl group. In some embodiments, the acylated lignin is acetylated, where —CO$^x$ is —COCH$_3$.

Certain embodiments of lignin-g-PLA copolymer comprising acylated lignin are provided herein below. In some embodiments, the lignin-g-PLA copolymer contains about 0.1-about 0.2 mmole/g, aliphatic hydroxy groups. In some embodiments, the lignin-g-PLA copolymer contains about 0.1 mmole/g —COOH groups.

In another embodiment, provided here are lignin-g-PLA copolymers prepared by the processes provided herein. In another embodiment, provided here are thermoset polymer prepared by the processes provided herein.

The copolymers provided herein are prepared as described below. Lignin (Indulin AT), lactides (LA) (L/D/DL), and TBD are dried in a vacuum prior to use. Lignin (1-50%), lactides (50-99%), and 1% TBD are mixed at 120-130° C. for two hours under nitrogen atmosphere. The lignin with grafted PLA (lignin-g-PLA) is then precipitated by adding the reaction mixture under stirring to a suitable solvent such as methanol. For example, a synthesis is schematically illustrated below:

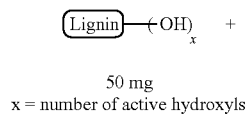

50 mg
x = number of active hydroxyls

Figure 3:
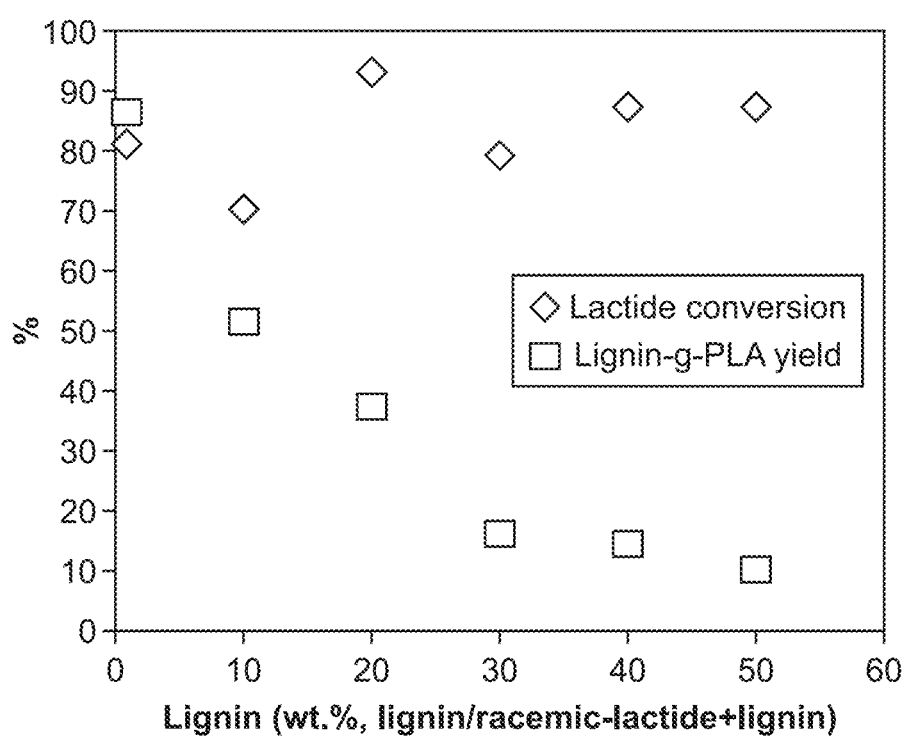
FIGS. 3 and 4 graphically illustrate the conversion and yield of the lignin-g-PLA copolymers according to certain aspects and embodiments of this invention based on lactide and lignin amounts when polymerized using triazabicyclodecene (TBD).
Figure 4:
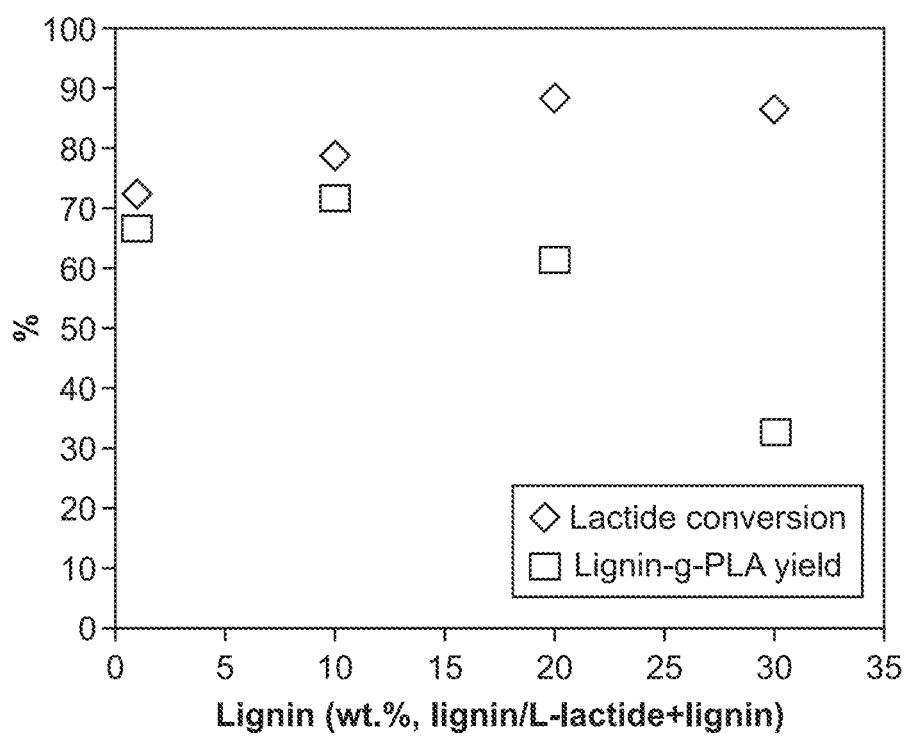

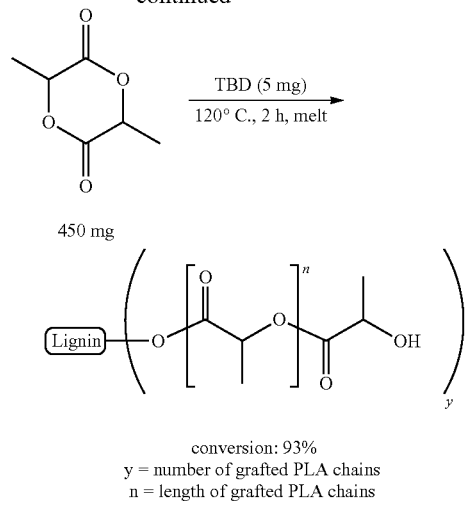

conversion: 93%
y = number of grafted PLA chains
n = length of grafted PLA chains As shown above, the number of lactic acid residues in the graft polymer is merely illustrative and more or less than 2 poly(lactic acid) units can be appended to the lignin. Certain non-limiting conversions and yields are graphically illustrated in FIGS. 3 and 4. Acylated lignin-g-PLA copolymers are prepared similarly by employing acylated lignin as a starting material.

Figure 5:
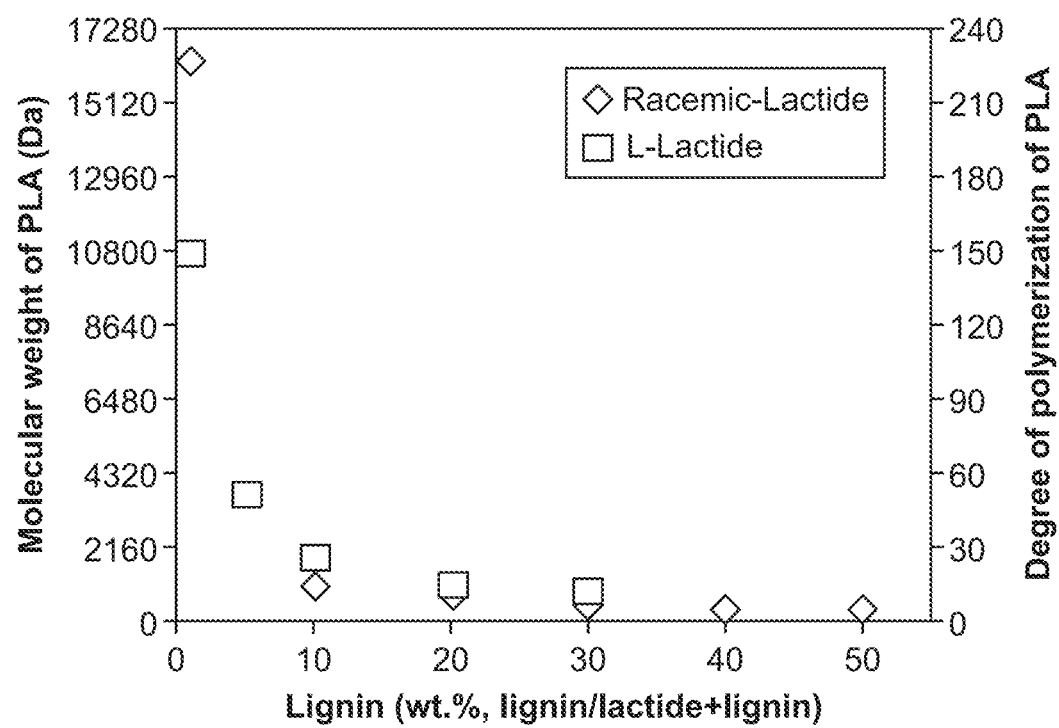
FIG. 5 graphically illustrates the PLA chain length dependence on lignin weight ratio in the lignin-g-PLA copolymers of certain aspects and embodiments of this invention as determined by $^1$H-nuclear magnetic resonance (NMR) spectroscopy.
Figure 6:
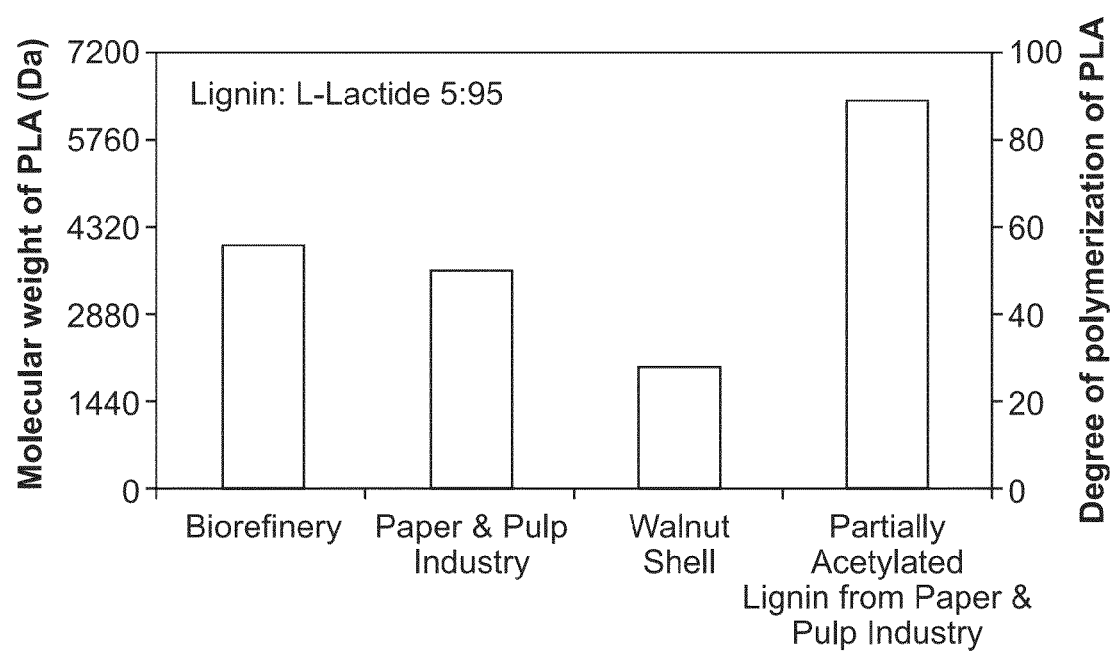
FIG. 6 graphically illustrates the PLA chain length dependence on lignin source in the lignin-g-PLA copolymers of certain aspects and embodiments of this invention as determined by $^1$H-nuclear magnetic resonance (NMR) spectroscopy.
Figure 8:
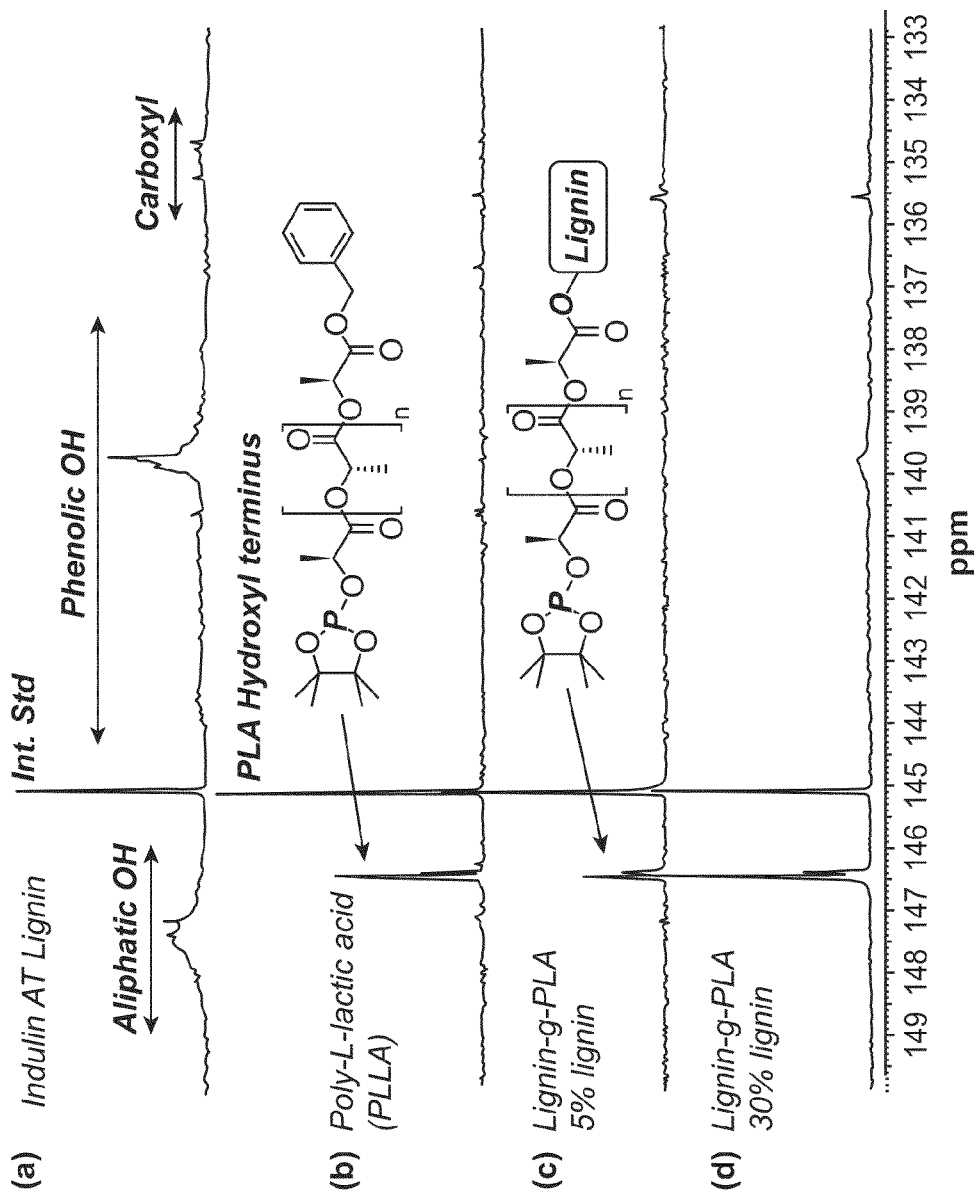
FIGS. 8(a-d) are $^{31}$P-NMR spectra of (a) lignin, (b) PLA, and lignin-g-PLA copolymers with (c) 5 wt. % lignin and (d) 30 wt. % lignin, derivatized by 2-chloro-4,4,5,5-tetramethyl-1,3,2-dioxaphospholane. Int. Std: internal standard (cyclohexanol).
Figure 9:
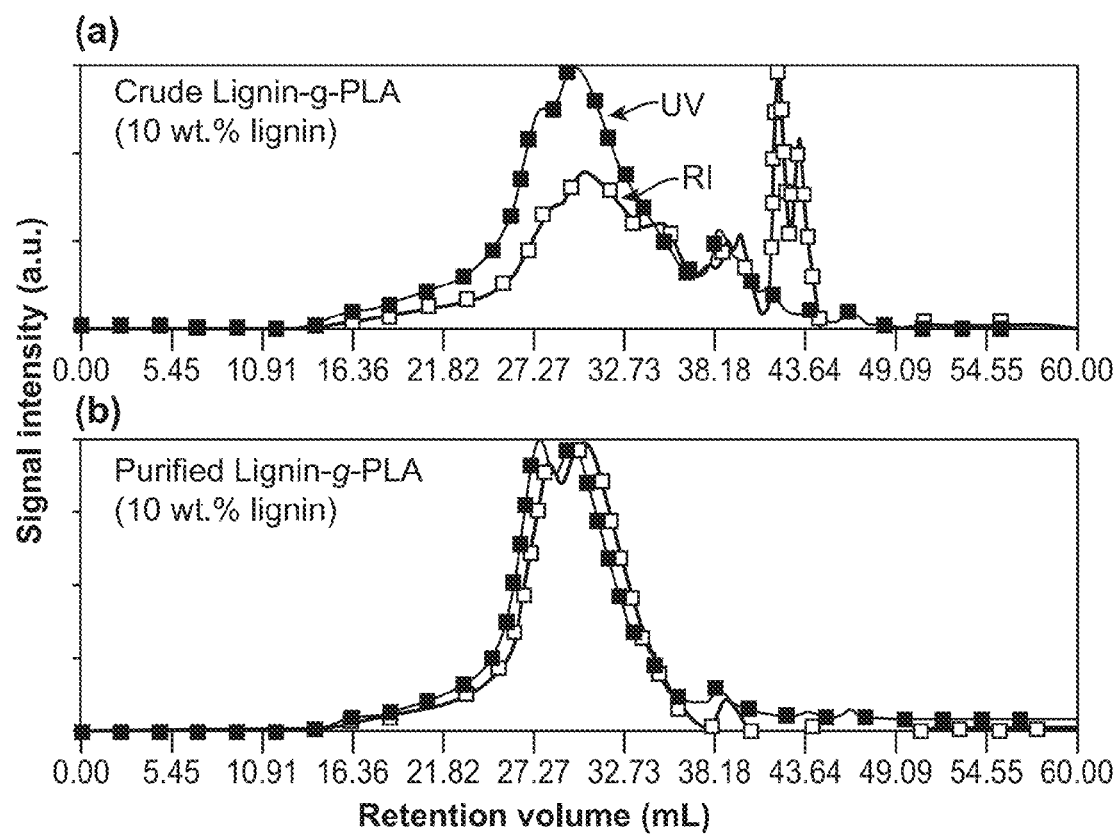
Figure 10:
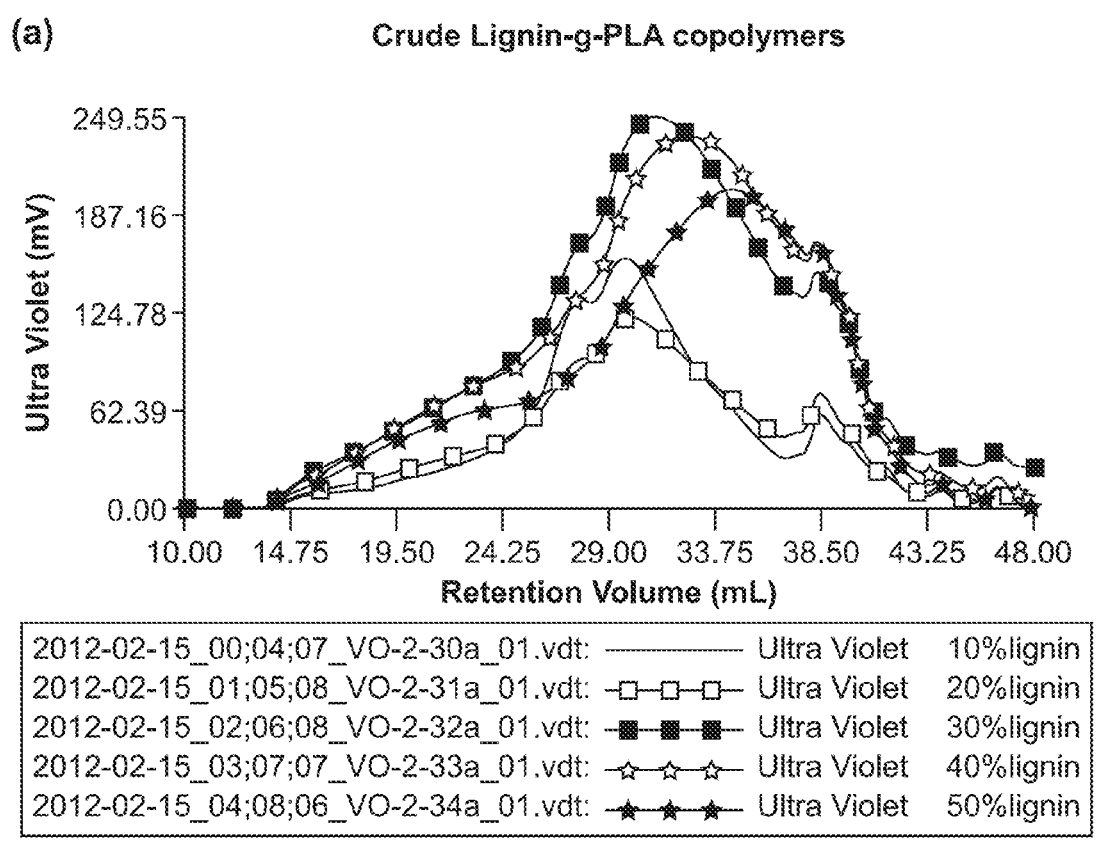
Figure 10:
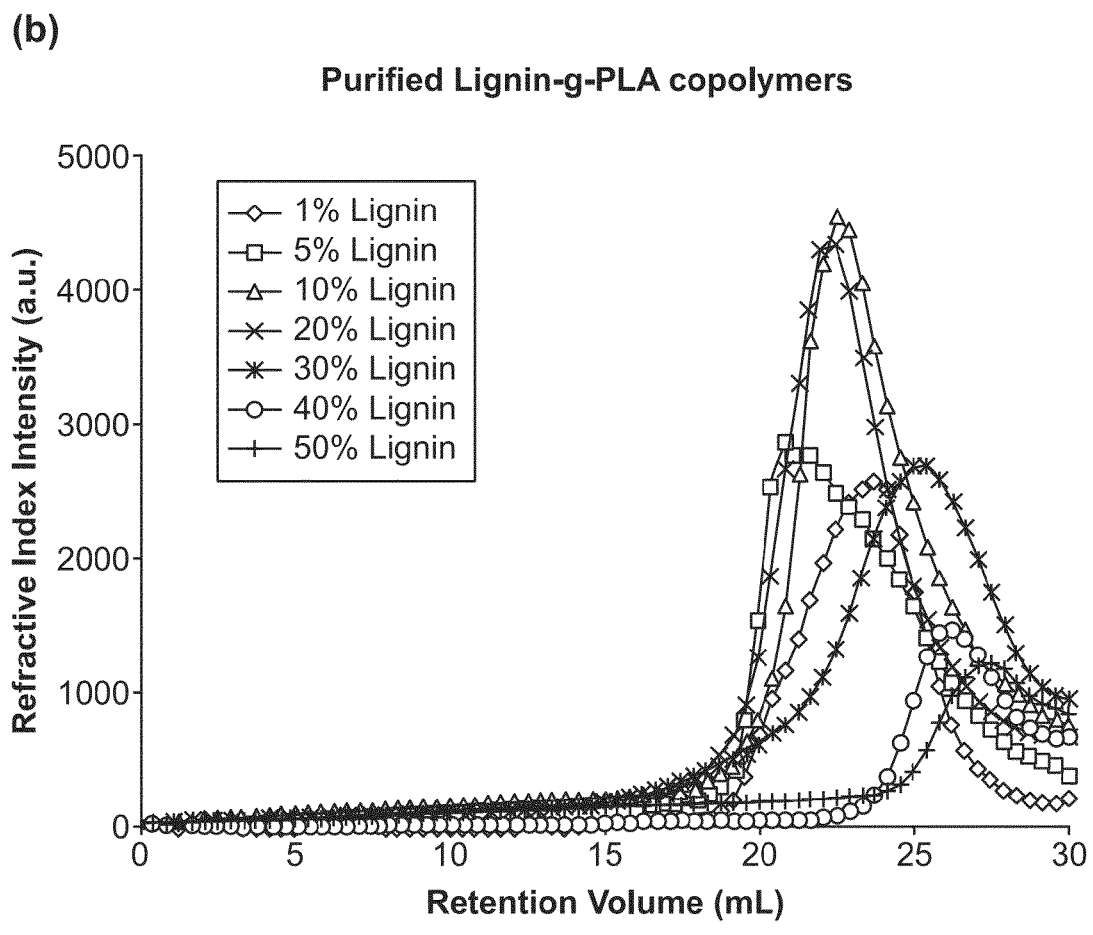
Figure 11:
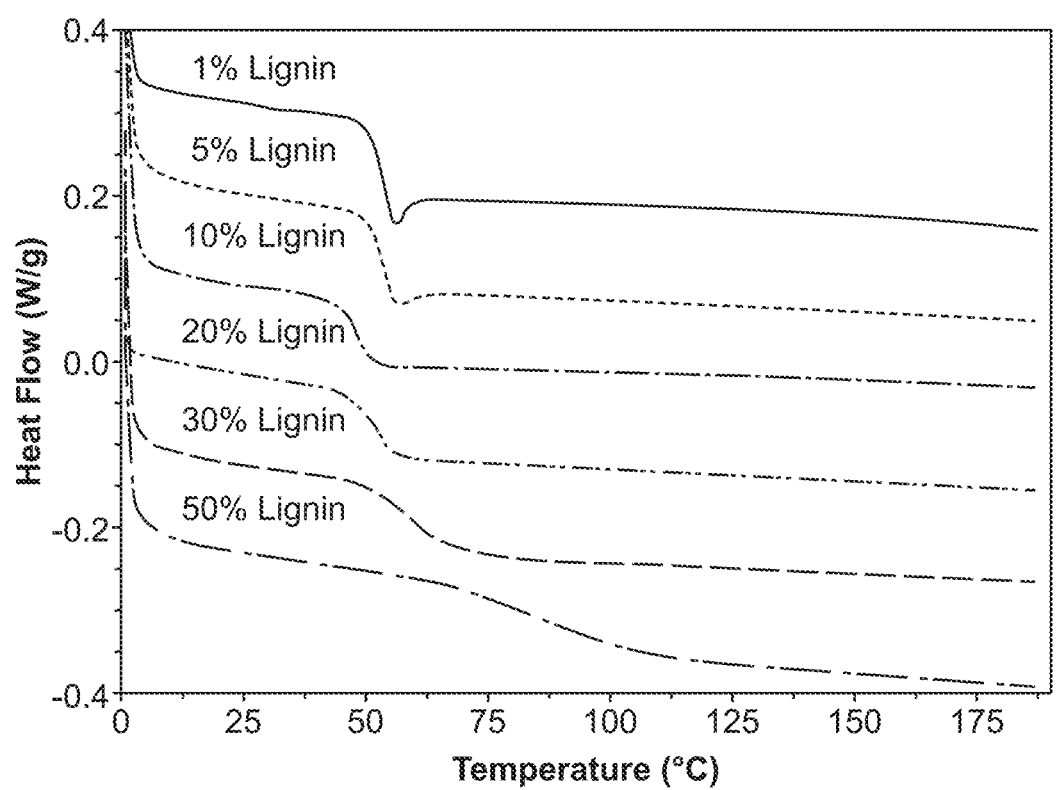
FIGS. 11 (a-c) provide, respectively (a) DSC curves of lignin-g-PLA copolymers on the second heating scan, (b) DSC curves of the copolymers annealed at 90° C. for 14 h prior to the DSC scanning from room temperature to 200° C. at 10° C./min, and (c) a plot of glass transition temperature ($T_g$) of lignin-g-PLA copolymers on the second heating scan.
Figure 14:
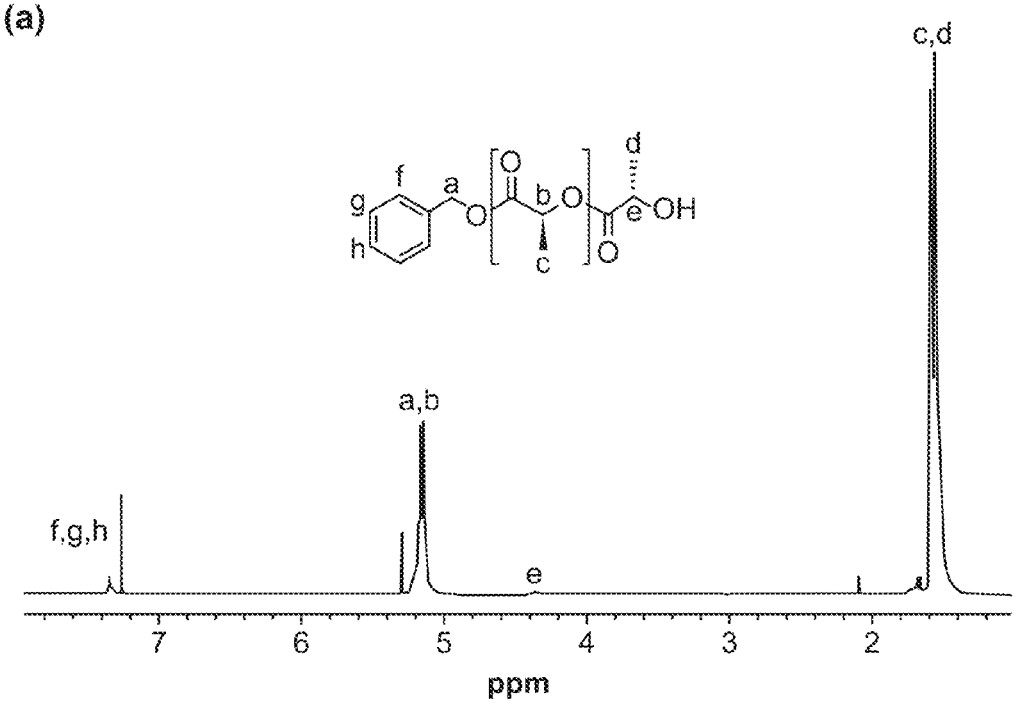
FIGS. 14(a-b) are $^1$H-NMR spectra of PLLA (poly-L-lactic acid) initiated by benzyl alcohol and 3-ethyl-phenol.
Figure 14:
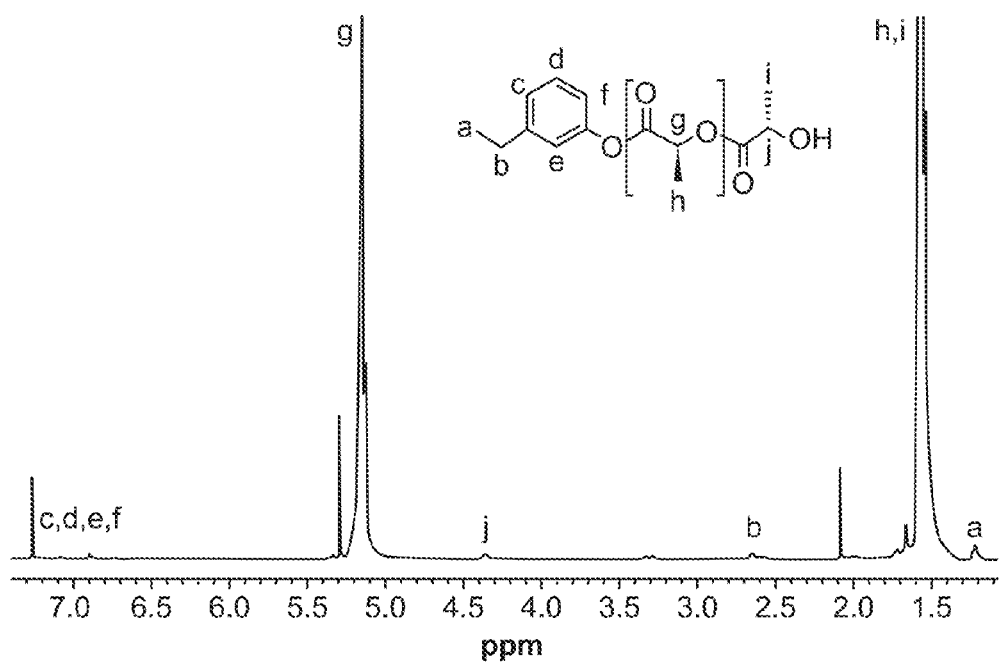
Figure 15:
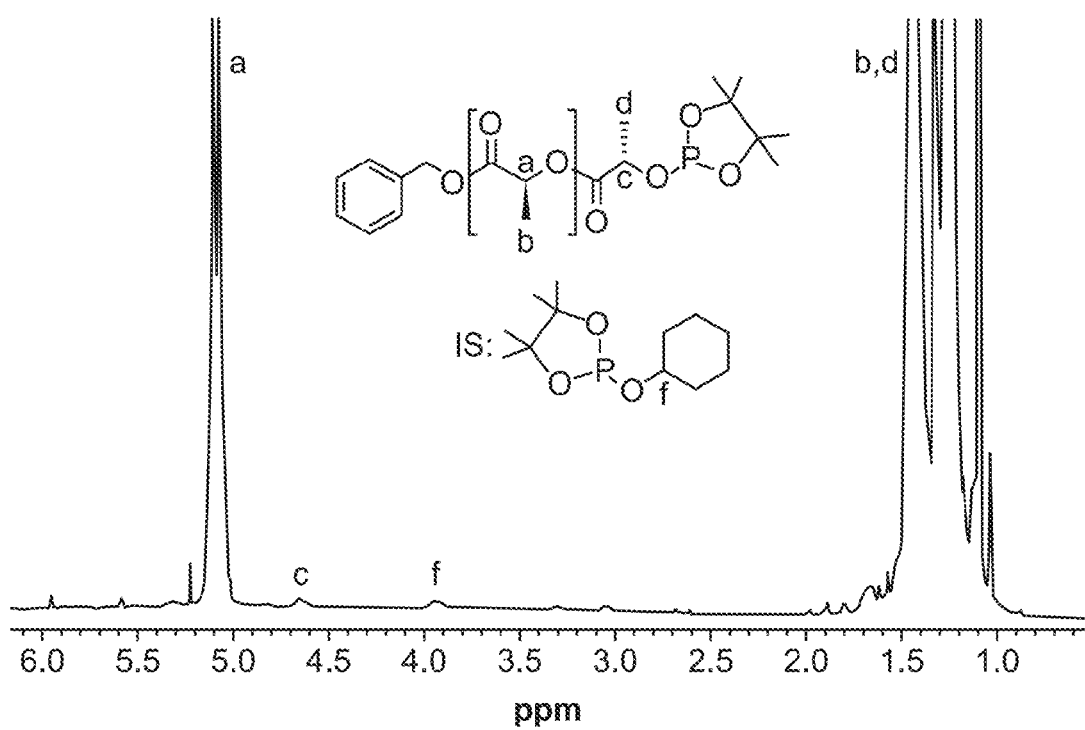
FIG. 15 is a $^1$H-NMR spectrum of end-group phosphitylated PLLA. IS: internal standard (cyclohexanol).
Figure 16:
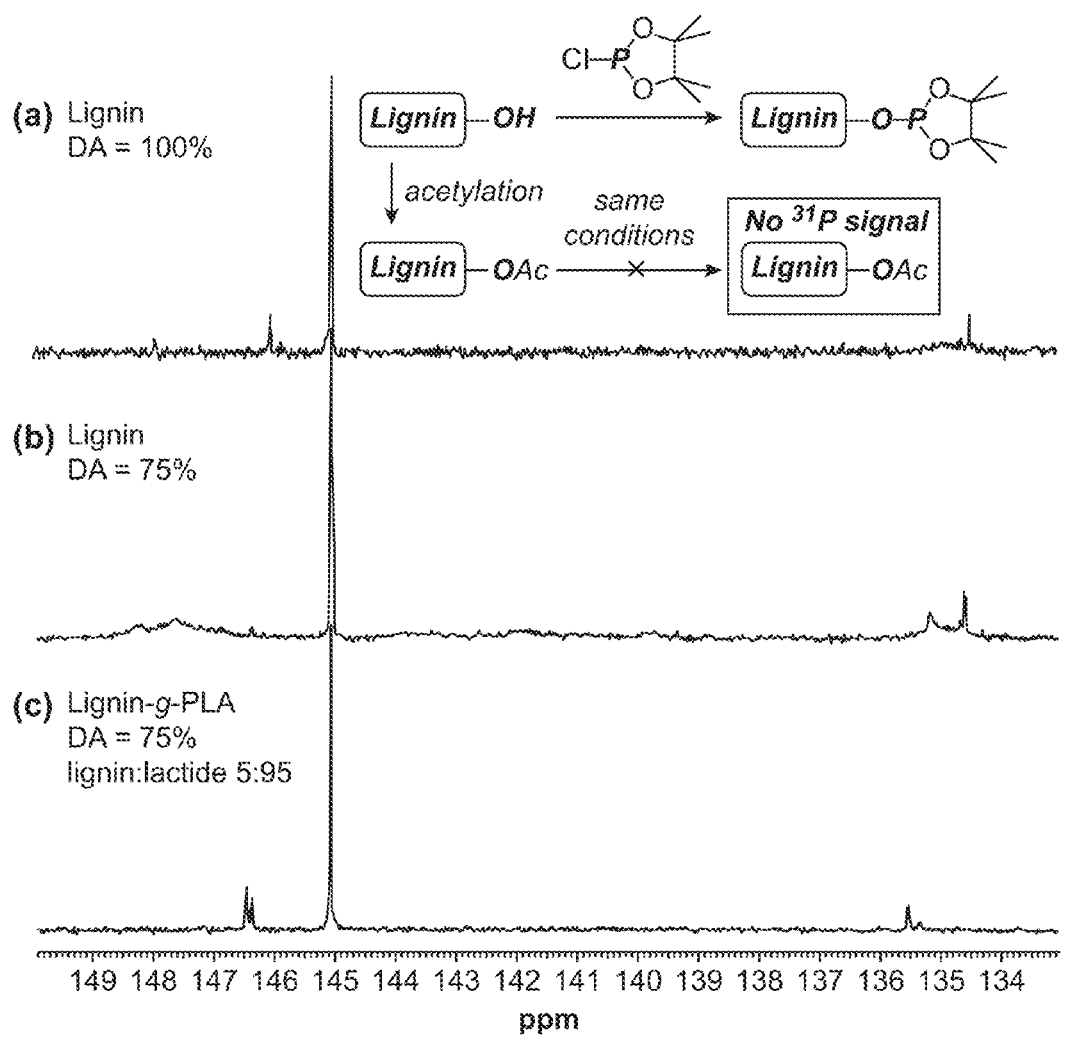
FIGS. 16(a-c) are $^{31}$P-NMR spectra of (a) completely acetylated lignin, (b) pre-acetylated lignin, and (c) pre-acetylated lignin-g-PLA copolymer (5 wt. % lignin). The degree of acetylated (DA) for pre-acetylated lignin is 75%.

These materials are characterized by a diverse range of methods including $^1$H-NMR (see, FIGS. 7 and 14), $^{31}$P-NMR (see, FIGS. 8 and 15-16), GPC or SEC (see, FIGS. 9-10), DSC (see, FIG. 11) and TGA. As used herein GPC, SEC, and TGA refer to gel permeation chromatography, size exclusion chromatography, and thermogravimetric analysis. By controlling the lignin weight ratio (FIG. 5) or the type of lignin (FIG. 6), the chain length of the grafted PLA was efficiently altered. Use of different kinds of lignin source and pretreatment, such as partial acetylation, allows the number of grafted chains to be altered in the range of 1-15 grafted PLA chains per lignin. The blending behavior of the materials with commercial PLA and other thermoplastics is studied in films by solvent casting, where miscibility is improved compared to non-modified lignin blends (FIG. 1). Tensile properties of certain of the graft copolymers of certain aspects and embodiments of this invention are measured and the results are graphically illustrated in FIG. 12.

In another embodiment, provided here are the lignin-g-PLA copolymers provided herein admixed with a thermoplastic polymer.

In another embodiment, the lignin-g-PLA copolymers provided herein are characterized by a glass transition temperature at about 40° C. to about 120° C., about 40° C. to about 50° C., about 50° C. to about 60° C., about 60° C. to about 70° C., about 70° C. to about 80° C., about 90° C. to about 100° C., about 100° C. to about 110° C., or about 110° C. to about 120° C.

In another aspect, provided herein are articles of manufacture comprising the lignin-g-PLA copolymers provided herein and/or the thermoset polymers provided herein and/or the thermoplastic polymers provided herein. In one embodiment, the article of manufacture is: a packaging material for light-sensitive products, ornamental flowers, and plants; a mobile phone case; a mulch film for weed control, increase of soil temperature, and moisture retention; a ultraviolet blocking material for sunglass and windows; a colorant or a coating material for papers; a ultraviolet-resistant roof shingle, tile, or a container; a coating material; or an adhesive (such as a bio-based glue).

Graft Polymerization of PLA into Lignin

Figure 13:
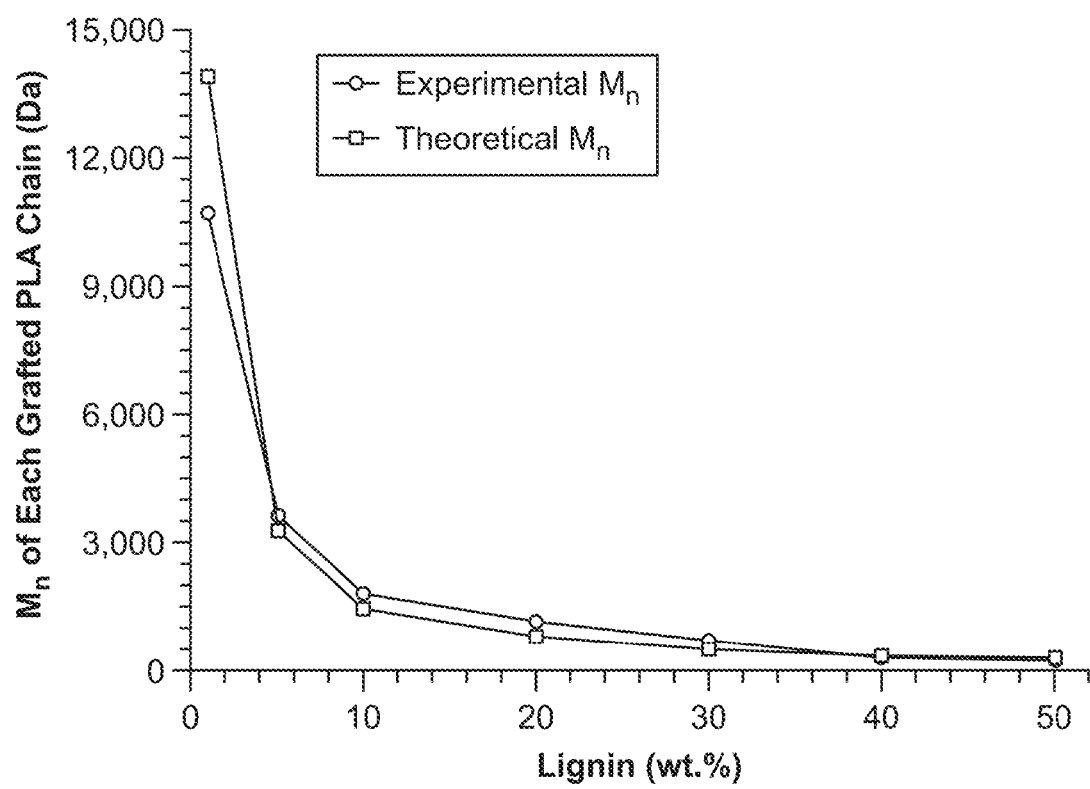
FIG. 13 graphically illustrates the number-average molecular weight ($M_n$) of each grafted PLA chain on the starlike lignin-g-PLA copolymers. The experimental PLA chain length was determined by $^1$H-NMR end-group integration. The theoretical value was determined as described in experimental section.

This technology arises in part out of the discovery that an organocatalytic ring-opening polymerization of lactide performed in the melt with catalytic triazabicyclododecene (TBD) in the presence of lignin (1-50%) cleanly generates a lignin-g-PLA copolymer (See scheme below and Table 1).

the end group of PLA ($H_B$), and the lignin, respectively. These spectra could also be used to calculate average PLA chain length in the copolymer by $^1$H-NMR end-group integration; as the weight fraction of lignin relative to lactide monomer increased, the resulting shorter PLA grafted chains decreased in length (as shown in FIG. 13), indicating that initiation of PLA polymerization at each lignin-OH group effectively competes with extension of the PLA chain.

Scheme 1

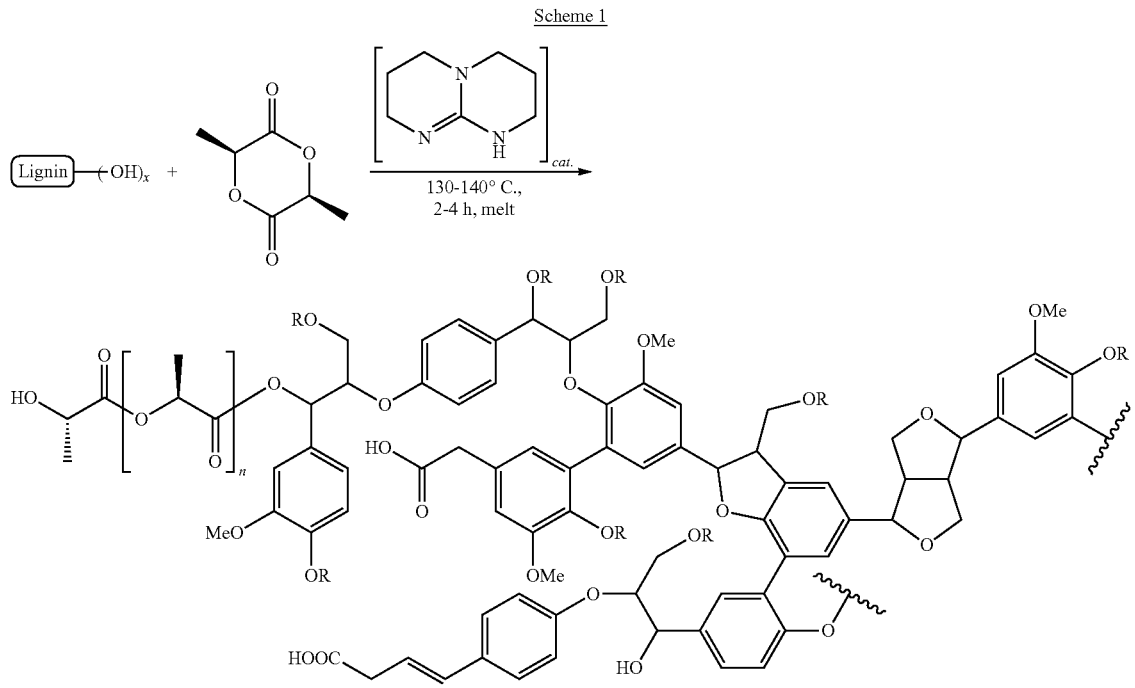

TABLE 1

Characterization and properties of lignin-g-PLA copolymers

| Copolymers | Lignin (wt. %) | Reaction time (h) | Reaction temperature (° C.) | Conversion of lactides (%)[a] | Isolated yield (%) | $M_n$ NMR (Da)[b] | $RV_p$ SEC (mL)[c] | Ð SEC[d] | $T_g$ (° C.)[e] |
|---|---|---|---|---|---|---|---|---|---|
| Lignin-g-PLA (1 g Scale) | 1 | 2 | 130 | 72 | 66 | 10,728 | 24.80 | 5.0 | 54 |
| | 10 | 2 | 130 | 78 | 71 | 1,800 | 22.14 | 6.0 | 45 |
| | 20 | 2 | 130 | 88 | 61 | 1,008 | 22.46 | 5.2 | 48 |
| | 30 | 2 | 130 | 86 | 32 | 792 | 24.13 | 6.5 | 53 |
| | 40 | 2 | 130 | 83 | 62 | 281 | 26.07 | 1.9 | 74 |
| Lignin-g-PLA (10 g Scale) | 5 | 3 | 130 | 88 | 85 | 3,600 | 21.17 | 6.1 | 55 |
| | 10 | 3.5 | 130 | 83 | 69 | 1,800 | 22.62 | 5.5 | 49 |
| | 20 | 3.5 | 140 | 93 | 64 | 1,140 | 22.31 | 6.9 | 52 |
| | 30 | 3.5 | 140 | 93 | 51 | 720 | 25.12 | 9.3 | 59 |
| | 50 | 3.5 | 140 | 90 | | 244 | 27.43 | 1.7 | |
| Lignin-g-PLA (Pre-acetylated lignin) | 5 (75% Acetylated) | 4 | 130 | 81 | 16 | 6,435 | 23.49 | 5.7 | 55 |

[a]Crude $^1$H-NMR integration;
[b]Number-average molecular weight ($M_n$) of each grafted PLA chain determined by $^1$H-NMR end-group integration of purified lignin-g-PLA copolymers.
[c]RVp: Retention volume for Size Exclusion Chromatography (SEC) peak in chloroform;
[d]Ð: Dispersity of lignin-g-PLA copolymers reported in terms of $M_w/M_n$ relative to polystyrene standards;
[e]Determined by Differential Scanning Calorimetry (DSC)

Figure 7:
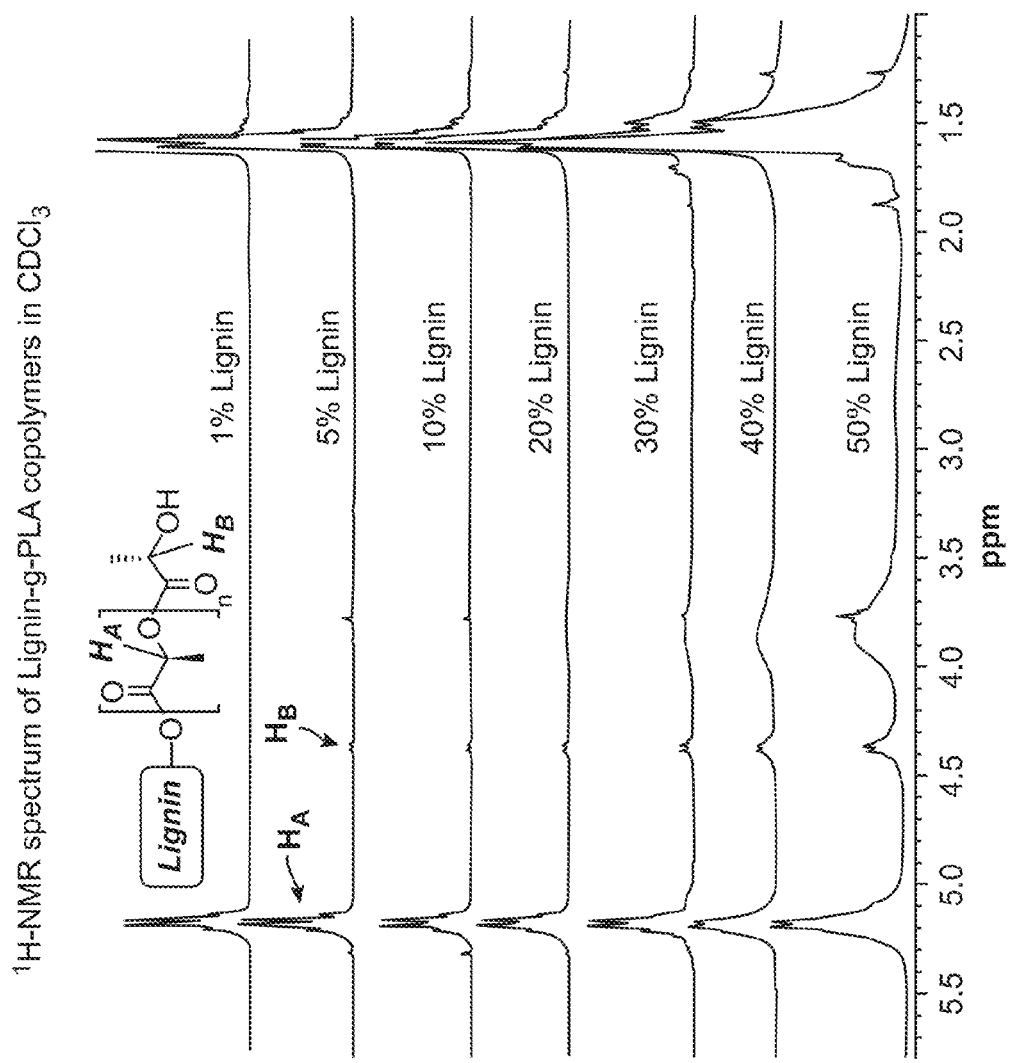
FIG. 7 is a stack-plot $^1$H-NMR spectra illustrating the relative amounts of PLA and lignin in various lignin-g-PLA copolymers of certain aspects and embodiments of this invention as determined by $^1$H-NMR spectroscopy.

Analysis of the isolated copolymers by $^1$H-NMR spectroscopy indicated efficient modification of lignin (FIG. 7). The resonances at 5.3-5.1, 4.4-4.3, and 4.0-3.5 ppm ($CDCl_3$) are assigned to the protons of the PLA repeating unit ($H_A$), By varying the lignin content from 1 to 50 wt. % in the graft polymerization process, the chain lengths of the grafted PLA could be controlled from number-average molecular weight ($M_n$) 200 to 11,000 Da (FIG. 13). The observed $M_n$ of the grafted PLA chains were in close agreement with the theoretical value predicted from the number of active hydroxyls on lignin determined by phosphitylation of the lignin substrate and analysis by $^{31}$P-NMR spectroscopy (Table 2).

TABLE 2

|  | Type of Lignin | |
|---|---|---|
|  | Neat Lignin | Pre-acetylated Lignin[c] |
| $M_n$ of Each Grafting PLA Chain (Da)[a] | 3600 | 6408 |
| Aliphatic OH 149-146 ppm[b] | 2.01 | 0.66 |
| Phenolic OH 144-137.5 ppm[b] | 3.10 | 0.58 |
| Total OH 149-137.5 ppm[b] | 5.10 | 1.24 |
| COOH 136-134 ppm[b] | 0.40 | 0.35 |

[a]$M_n$ is determined by $^1$H-NMR end-group integration.
[b]Hydroxyl (OH) group content in units of mmole/g;
[c]Degree of acetylation (DA) of the pre-acetylated lignin is 75%. The DA is determined by dividing the acetylated OH group content (5.10 − 1.24 = 3.86 mmole/g) of the pre-acetylated lignin by that of the unmodified lignin (5.10 mmole/g).

To assess the efficiency of the grafting method, the PLA-grafted lignin was phosphitylated and compared the $^{31}$P-NMR spectra to that of phosphitylated lignin and PLA. In FIG. 8(a), the resonances at 149-146, 144-137.5, and 136-134 ppm (CDCl$_3$) are assigned as the phosphotriesters of the aliphatic hydroxyl (OH), phenolic OH, and carboxylic groups of lignin, respectively. The $^{31}$P chemical shifts of phosphotriesters derived from the terminal hydroxy group of PLA occur at 146.2-146.5 ppm, as shown in FIG. 8(b). The absence of $^{31}$P resonances corresponding to aliphatic and phenolic lignin OH signals (149-146 and 144-137.5 ppm, respectively) in FIG. 8(c) and the presence of $^{31}$P resonances corresponding to PLA terminal hydroxyls at 146.5 ppm (at 5 wt. % lignin) indicates that all detectable OH groups of lignin are covalently modified by PLA chains in the 5 wt. % lignin-g-PLA copolymer. For higher lignin loadings (30%), some lignin phenolic OH functionality is unmodified, as indicated by the broad peak at 140-139.5 ppm (FIG. 8(d) and Table 3).

TABLE 3

Characterizing the amount of functional groups for lignin-g-PLA copolymers determined by $^{31}$P-NMR analysis

| Copolymers | Lignin (wt. %) | Aliphatic OH 149-146 ppm | Phenolic OH 144-137.5 ppm | Total OH 149-137.5 ppm | COOH 136-134 ppm |
|---|---|---|---|---|---|
| Lignin-g-PLA | 1 | 0.19 | 0.03 | 0.22 | 0.09 |
|  | 5 | 0.36 | 0.03 | 0.39 | 0.09 |
|  | 10 | 0.45 | 0.14 | 0.59 | 0.06 |
|  | 20 | 0.64 | 0.21 | 0.85 | 0.06 |
|  | 30 | 0.98 | 0.46 | 1.44 | 0.05 |
|  | 50 | 1.06 | 0.82 | 1.87 | 0.05 |
| Lignin-g-PLA (Pre-acetylated lignin) | 5 (75% Acetylated) | 0.12 | 0.00 | 0.12 | 0.08 |

Hydroxyl and carboxyl group content in units of mmole/g

It was observed, surprisingly, that according to the present technology, phenols, while somewhat slower initiators than aliphatic alcohols, act as initiators in the polymerization. This was also supported by control experiments of TBD-catalyzed lactide polymerization (130° C., 4 h, melt) with aliphatic (benzyl alcohol) and phenolic initiator (3-ethyl-phenol) at a target degree of polymerization (DP) of (Table 4).

TABLE 4

Polymerization of L-lactide using benzyl alcohol and 3-ethyl-phenol initiators.

| Initiator | Temp. (° C.) | Time (h) | Conversion of lactides (%)[a] | Isolated yield (%) | $M_n^b$ (theoretical) | $M_n^c$ (NMR) | $M_n^d$ (SEC) | $M_w/M_n^d$ (SEC) |
|---|---|---|---|---|---|---|---|---|
| benzyl alcohol | 130 | 3 | 96 | 62 | 3600 | 3600 | 4500 | 2.41 |
| 3-ethyl-phenol | 130 | 3 | 95 | 86 | 3700 | 7200 | 10000 | 2.94 |

The polymerizations were carried out as described in the experimental section, and used TBD (10 mg, 0.07 mmole, 1 mol %) together with benzyl alcohol (30 mg, 0.28 mmol) or 3-ethyl-phenol (34 mg, 0.28 mmol) as initiators for the polymerization of L-lactide (1 g, 6.9 mmol).

[a]Determined by $^1$H-NMR integration of the methide proton on lactide relative to PLA.
[b]The theoretical $M_n$ value for PLA chains was calculated by dividing the mmoles of lactide by mmoles initiators OH. The maximum $M_n$ for grafted PLA chains was then multiplied by the observed conversion of lactide in the grafting reaction.
[c]From $^1$H-NMR end-group integration of the methide proton on the isolated polymers.
[d]Determined by SEC (CHCl$_3$) relative to polystyrene standards Initiation by benzyl alcohol resulted in an observed $M_n$ of 3600 Da, whereas 3-ethyl-phenol as initiator gave a higher $M_n$ (7200 Da). The presence of the phenolic end-group was confirmed by $^1$H-NMR on the isolated PLA, and integrated (1:1) against the methide alcohol end-group (FIG. 14(b)). This shows that phenols can act as initiators in the polymerization of LA.

To increase the length of PLA chains while keeping the lignin content high in the copolymer, a series of lignin samples with varying degrees of acetylation (Table 5 and FIG. 16) were prepared.

TABLE 5

Characterizing the amount of aliphatic and phenolic hydroxyl groups on the neat and acetylated lignin

| No. | Ac$_2$O$^a$ | NMI$^b$ | Aliphatic OH 149-146 ppm | Phenolic OH 144-137.5 ppm | Total OH 149-137.5 ppm | COOH 136-134 ppm |
|---|---|---|---|---|---|---|
| 1 | — | — | 2.01 (0)$^d$ | 3.10 (0) | 5.11 (0) | 0.41 |
| 2$^c$ | 0.33 | — | 1.70 (15) | 1.98 (36) | 3.68 (28) | 0.31 |
| 3 | 0.33 | — | 1.59 (21) | 1.63 (47) | 3.22 (37) | 0.30 |
| 4 | 0.66 | — | 1.16 (42) | 0.91 (71) | 2.07 (60) | 0.29 |
| 5 | 1.32 | — | 0.89 (56) | 0.65 (79) | 1.55 (70) | 0.30 |
| 6 | 2.64 | — | 0.66 (67) | 0.58 (81) | 1.24 (75) | 0.35 |
| 7 | 3.00 | — | 0.53 (74) | 0.52 (83) | 1.06 (79) | 0.36 |
| 8 | 3.00 | 1.0 | 0.31 (15) | 0.32 (90) | 0.63 (88) | 0.35 |
| 9 | 3.00 | 5.0 | 0.12 (94) | 0.19 (94) | 0.31 (94) | 0.36 |
| 10 | 3.00 | 10.0 | 0.11 (92) | 0.22 (93) | 0.33 (94) | 0.39 |
| 11 | 3.00 | 50.0 | 0.07 (96) | 0.21 (93) | 0.28 (94) | 0.39 |

Hydroxyl and carboxyl group content in units of mmole/g. General reaction procedure: 1.0 g lignin was added the indicated amount of acetylating agent, acetic anhydride (Ac2O) and a catalyst, N-methylimidazole (NMI), and topped up to a final volume of 4.0 mL using p-dioxane, and heated to 50° C. for 2 h.
$^a$amounts in mL, 10.6 mmole/mL
$^b$amounts in μL, 12.6 μmole/μL
$^c$30 mins reaction time
$^d$degree of acetylation (DA)

Lignin (75% acetylated) was used in the synthesis of lignin-g-PLA copolymer (5 wt. % lignin). Table 2 shows that a substantial increase in molecular weight of each grafted PLA chain was observed in the resulting lignin-g-PLA copolymer ($M_n$=6408) compared to the neat lignin ($M_n$=3600, Indulin AT).

In contrast to unmodified lignin The lignin-g-PLA copolymers were soluble in common organic solvents such as CHCl$_3$ and THF. A trend of increasing solubility in such organic solvents was observed as the PLA chain length increased.

Thermal Properties of Lignin-g-PLA Copolymers

Lignin has a relatively high glass transition temperature ($T_g$=150° C.) as compared to commercial bioplastics such as PLLA (63° C.), polycaprolactone or PCL (−60° C.), and Poly(3-hydroxybutyrate-co-3-hydroxyvalerate or PHBV) (−9°. The condensed, rigid phenolic moieties and intermolecular hydrogen bonding interactions present unmodified lignin restrict the thermal mobility of lignin molecules and result in its high $T_g$. DSC analysis of the lignin-g-PLA copolymers shows that the incorporation of lignin substantially influences the glass transition temperatures ($T_g$) of the lignin-g-PLA copolymers (FIG. 11(a)). Glass transition temperatures for lignin-g-PLA copolymers ranging from 45-85° C. were observed, depending on the initial lignin/LA ratio (FIG. 11(c) and Table 1).

At low lignin content (1-5 wt. %), the measured $T_g$s do not differ substantially from that of polylactide (63° C.). At higher lignin content (>10%), where the length of the grafted PLA chains are lower than $M_n$=2000 (FIG. 13), the $T_g$s increase as the weight fraction of lignin increases (FIG. 11(c)). For lignin contents from 10-40 wt. %, the $T_g$s increase from ca. 45° C. to 75° C.; at 50 wt. % lignin the transition is sufficiently broad that it is difficult to identify the $T_g$. When the lignin-g-PLA copolymers are annealed at 90° C. for 14 h before the DSC scan (FIG. 11(b)), an endotherm is observed with an onset of approximately 110° C. for samples containing 1-10% lignin. The endotherm is likely due to the melting of PLA crystals ($T_m$ of PLA=90° C. ($M_n$=about 1 kDa) to 185° C. ($M_n$=about 100 kDa)). The incorporation of lignin in PLLA structure reduced the crystallization of PLA during annealing treatment.

Optical and Mechanical Properties

The optical and mechanical properties resulting from blending unmodified lignin and lignin-g-PLA copolymers with commercial PLA was studied in hot-pressed films. Table 6 illustrates the composition and abbreviation for the PLA-lignin blends.

TABLE 6

Composition and abbreviation for PLA-lignin composites

| Abbreviations | Lignin (wt. %)$^a$ | PLA (g) | Unmodified lignin (g) | Lignin-g-PLA copolymers (g) 10:90$^b$ | 40:60$^b$ |
|---|---|---|---|---|---|
| PLA | 0 | 100 | — | — | — |
| PLA1L | 1.0 | 100 | 1 | — | — |
| PLA5L | 4.8 | 100 | 5 | — | — |
| PLA1C | 0.9 | 100 | — | 10 | — |
| PLA5C | 4.4 | 100 | — | — | 12.5 |

$^a$Lignin content in the composites;
$^b$Lignin:L-lactide weight ratio.

FIGS. 1(b-c) show that the unmodified lignin forms aggregated particles in the PLA matrix. Without being bound by theory, the presence of polar groups on lignin can favor self-aggregation because they can form clusters of lignin through hydrogen bonding. Grafting PLA chains switches the polarity of lignin from hydrophilic to hydrophobic; thus, lignin-g-PLA copolymer interacts more favorably with a surrounding hydrophobic PLA matrix and displays increased dispersion in the PLA materials (FIGS. 1(d-e)). The interaction between the grafted chains and the polymeric matrix is tailored by varying the species of the grafted monomers and chain lengths to achieve good dispersion of lignin particles in a wide range of thermoplastic materials.

The absorption of UV light is an important property for designing packaging materials to protect light sensitive products from damage during storage. It is reported that PLA materials have UV light barrier properties better than that of low density polyethylene (LDPE), but worse than those of poly(ethylene terephthalate) (PET), cellophane, and polystyrene (PS).

Figure 17:
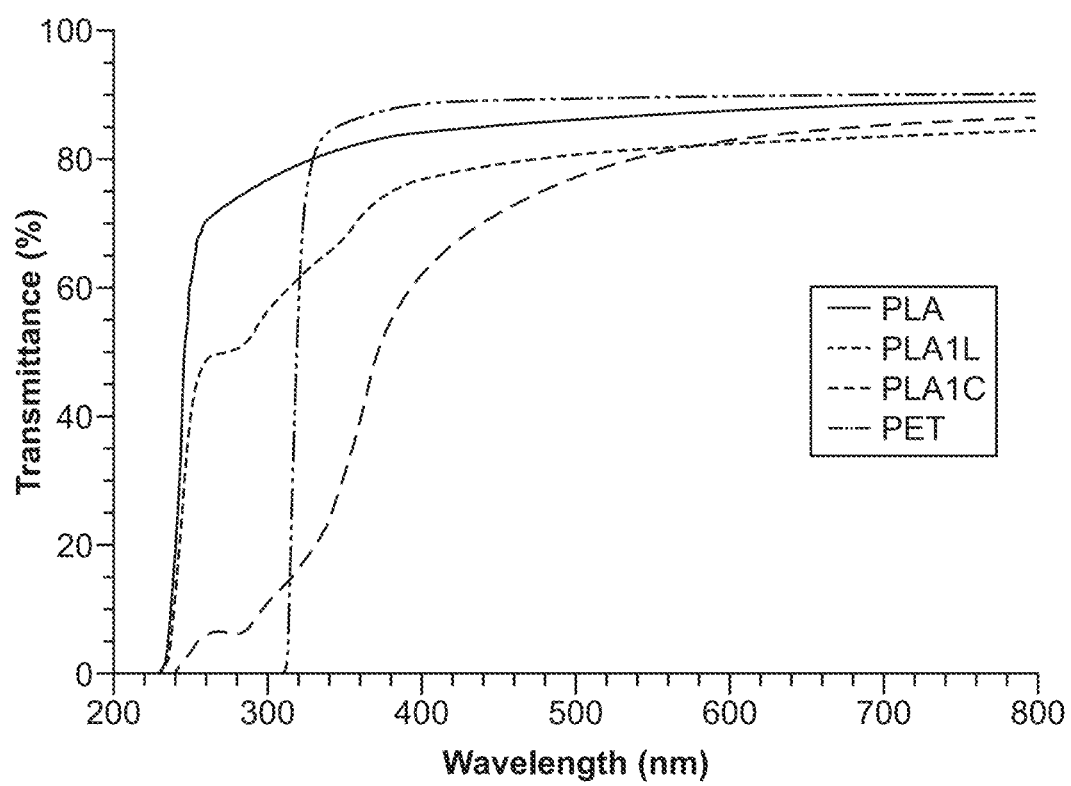
FIG. 17 provides a UV-VIS spectrum for PLA, PET, and PLA-lignin composites with unmodified lignin (PLA1L) and lignin-g-PLA copolymers (PLA1C). The amounts of lignin in the PLA films with unmodified lignin (PLA1L) and with lignin-g-PLA copolymers (PLA1C) are 1% and 0.9%, respectively.

The light barrier properties of PLA films with unmodified lignin and lignin-g-PLA copolymers were tested and compared with PET films (as shown in FIG. 17). The PLA film shows no ultraviolet (UV) light transmission in the lower range of UV-C (100-230 nm), while the PET film does not transmit both UV-C (100-280 nm) and UV-B (280-315 nm). By adding a low amount of lignin (0.9 wt. %) grafted into PLA films, the PLA-lignin films (PLA1C) show UV light barrier properties, which block nearly all the UV-C and UV-B and half of the UV-A (315-400 nm). The unmodified lignin (PLA1L) did not substantially reduce the UV light transmission because of the poor dispersion in the PLA materials. Most of the UV light passes through the films without encountering and being absorbed by the unmodified lignin. However, the lignin-g-PLA copolymer acts as a well-dispersed UV blocker that can be applied in the biocompatible packaging and surface coating industry for preventing damage and extending shelf life of light sensitive products.

Figure 12:
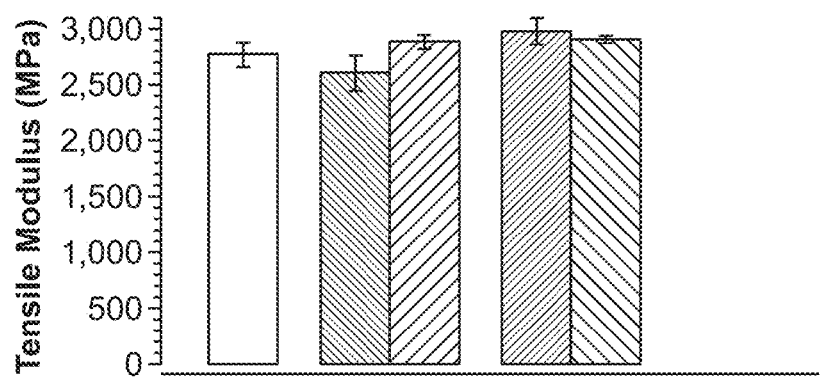
FIGS. 12 (a-c) graphically illustrates mechanical properties of PLA-lignin composites. The lignin content in the PLA1L/PLA1C and PLA5L/PLA5C are 0.9-1.0 wt. % and 4.4-4.8 wt. %, respectively.
Figure 12:
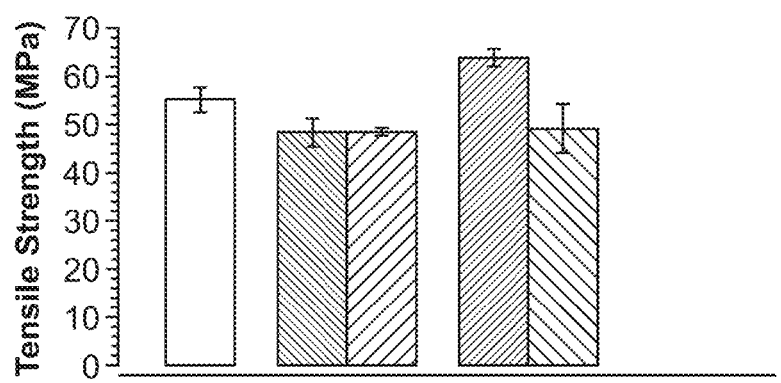
Figure 12:
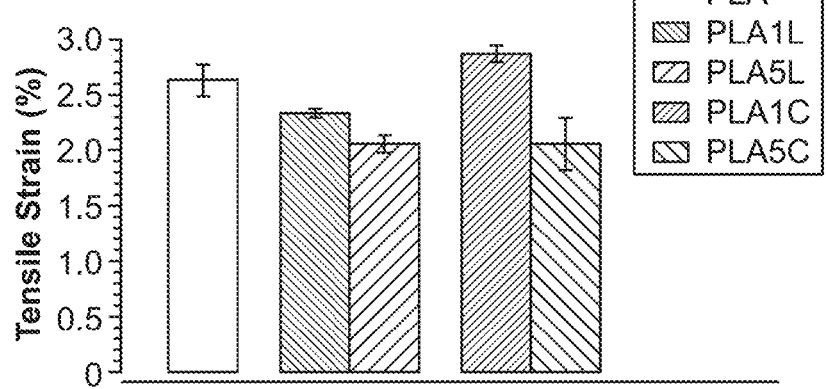

The mechanical properties of tensile modulus of elasticity, tensile strength, and strain at ultimate tensile strength of PLA-lignin composites were evaluated by tensile tests of hot-pressed films (FIG. 12). It is reported that the tensile strength and elongation at break of PLA-lignin composites decreases with increasing lignin content, while the Young's modulus in tension remains constant up to a lignin content of 20 wt. %. It is also reported that the tensile strength and elongation at break decreases with the addition of lignin in a PLA matrix but that Young's modulus in tension increases (20%) with 20 wt. % lignin addition. In the experiments reported here, the incorporation of lignin-g-PLA copolymers (lignin:lactide 10:90) into PLA (PLA1C) results in an increased tensile strength (+16%) and strain (+9%) without a sacrifice in the tensile modulus (FIG. 12). The tensile strength and strain for the PLA composites with unmodified lignin (PLA1L and PLA5L) and lignin-g-PLA copolymers with a higher wt. % of lignin (lignin:lactide 40:60)(PLA5C) decreased compared to the neat PLA materials (PLA). The mechanical property results show that lignin-g-PLA copolymers with appropriate grafted PLA chain lengths can be utilized as well-dispersed polymeric plasticizers for improving flexibility and toughness of brittle PLA materials.

The tensile modulus of elasticity for PLA-lignin composites was estimated by the rule of mixtures (Table 7). The experimental modulus of elasticity for both PLA composites with unmodified lignin (PLA1 L and PLA5L) and lignin-g-PLA copolymers with a higher wt. % of lignin (lignin:lactide 40:60)(PLA5C) were in close agreement with the estimated value. The slight positive deviation of modulus of elasticity from the estimated value of PLA1C suggests the lignin-g-PLA copolymer with appropriate grafted PLA chain lengths might have a synergistic reinforcement effect on the modulus of elasticity of the PLA materials.

TABLE 7

Comparison of the estimated and experimental modulus of elasticity for PLA-lignin composites

| Materials | Experimental Modulus of Elasticity (MPa) | Estimated Modulus of Elasticity (MPa)[a] |
|---|---|---|
| Lignin | 4500 | — |
| PLA | 2764 ± 111 | — |
| PLA1L | 2586 ± 161 | 2780 |
| PLA5L | 2886 ± 63 | 2843 |
| PLA1C | 2968 ± 116 | 2779 |
| PLA5C | 2902 ± 35 | 2838 |

[a]The tensile modulus of elasticity is predicted by the rule of mixtures: $E_c = E_{PLA}V_{PLA} + E_{lignin}V_{lignin}$, where $E_c$ is the modulus of the composites, $E_{PLA}$ and $E_{lignin}$ are the modulus of PLA (2764 MPa) and lignin (4500 MPa), and $V_{PLA}$ and $V_{lignin}$ are the volume fractions of PLA and lignin.

Certain aspects and embodiments of this invention having been described in summary and in detail is illustrated and not limited by the examples below.

EXAMPLES

General Experimental Procedures
Materials

Lignin (Indulin A T, Westvaco, Charleston, S.C.) was dried at 50° C. in vacuo for 36 h and stored in a glove-box ($N_2$) prior to use. L-lactide (S,S)(LLA)(Purac Biochem, Netherlands) and TBD (Aldrich) were used as received and stored in a glove-box under nitrogen. 2-Chloro-4,4,5,5-tetramethyl-1,3,2-dioxaphospholane (TMDP, Sigma-Aldrich), cyclohexanol (Alfa Aesar), chromium (III) acetylacetonate (Strem Chemicals), deuterated chloroform (Cambridge Isotope Laboratories), pyridine (EMD Chemicals), acetic anhydride (EMD Chemicals), N-methylmidazole (Acros Organics), p-dioxane (JT Baker), chloroform (Fisher), isopropanol (Fisher) and poly(lactic acid) (2003D, NatureWorks LLC, MN) were used as received without further purification. Oven-dried glassware and stir bars were used for all polymerization experiments. All polymerization reactions were carried out under inert atmosphere ($N_2$).

Characterization $^1$H-nuclear magnetic resonance (NMR) spectra were recorded at room temperature on a Varian 300, 400 (100), or 500 MHz spectrometer, with shifts reported in parts per million downfield from tetramethylsilane and referenced to the residual solvent peak. $^{31}$P-NMR spectra were obtained on a Varian mercury plus spectrometer, equipped with a 4-nucleus switchable and pulse field gradient probe operating at 162 MHz. Experiments were performed at 25° C. in $CDCl_3$. Chemical shifts were calibrated from the sharp $^{31}$P-NMR signal at 132.2 ppm arising from the reaction product between residual water and TMDP. Spectra were quantitative with proton broad bands decoupling only during acquisition time. Cyclohexanol was used as an internal standard for the quantitative evaluation of the lignin hydroxyl group content. $^{31}$P-NMR spectra were obtained with a 100 kHz spectral width, 128,000 data points, 8 sec relaxation delay, 0.64 sec acquisition time and 8 μsec for a 55.4° pulse, and 1 Hz line broadening, using 128 scans. Content of different hydroxyl groups were obtained by the integration values of the spectral regions arising from aliphatic hydroxyls (149 to 146 ppm), phenolic hydroxyls (144 to 137.5 ppm), and carboxyls (136 to 134 ppm) relative to the internal standard (145.5 to 144.5 ppm).

Differential scanning calorimetry (DSC) was performed on a TA Instruments Q100 and Q2000 DSC using a heating and cooling rate of 10° C./min and nitrogen flow rate of 50 mL/min. The samples were heated from 0° C. to 190° C., cooled down to 0° C., and then heated to 190° C. again. Glass transition temperature ($T_g$) was determined on the second heating scan if not otherwise specified. The size exclusion chromatography (SEC) system included a Shimadzu LC-20AD pump, a Shimadzu SIL-20AC HT autosampler, a CTO-20A column oven, and a Shimadzu RID-10A refractive index detector. A Jordi Gel DVB guard column (500 Å) and three Jordi Gel DVB analytical columns (500 Å, $10^4$ Å, and $10^5$ Å) were used with chloroform as the eluting solvent (1 mL/min) at 40° C. The system was calibrated using polystyrene standards from Varian (Calibration Kit S-M2-10, USA) and Shodex (Showa Denko K.K., Tokyo, Japan). Samples (5 mg) were dissolved in chloroform (1 mL) and then filtered through a 0.22 μm PTFE membrane before injection into the SEC system.

For phosphitylation a solvent mixture composed of deuterated chloroform ($CDCl_3$) and pyridine (1.6/1.0, v/v) was prepared and dried over molecular sieves prior to use. This solution was used for the preparation of relaxation reagent solution (RR, chromium(III) acetylacetonate, 5.0 mg/mL) and the internal standard solution (IS, cyclohexanol, 10.0 mg/mL). 15.0 mg of oven-dried sample was dissolved in $CDCl_3$-pyridine solvent (370 μL) followed by the addition of RR (50 μL) and IS (50 μL). The resulting solution was left to stand for an hour to ensure total dissolution. TMDP (30 μL) was then added and let stand for at least 7 h to ensure complete derivatization prior to $^{31}P$-NMR analysis. The phosphitylated PLA polymer was analyzed by in-situ $^1H$-NMR ($CDCl_3$) (FIG. 15) and $^{31}P$-NMR ($CDCl_3$) (FIG. 8(b)).

Example 1

Synthesis of Lignin-g-PLA Copolymers

Lignin:Lactide 10:90: Inside a glove-box ($N_2$), TBD catalyst (100 mg, 1 wt. %), lignin (1 g, 10 wt. %) and L-lactide (9 g, 90 wt. %), were weighed into a reaction vial (25 mL) equipped with a stir bar. The vial was sealed, taken outside the box, and immersed into an oil-bath at 130° C. for 3.5 h with stirring. The reaction mixture was then cooled to room temperature and was subsequently quenched by a dichloromethane solution (5 mL) of acetic acid (100 mg). After the residue had completely dissolved, an aliquot was taken out and concentrated in vacuo for $^1H$-NMR analysis (in $CDCl_3$). L-lactide conversion (83%) was determined by integration of the L-lactide methide signal (5.03 ppm) against the integration of the PLA methide signal (5.16 ppm). The remainder of the crude reaction mixture was then concentrated on a rotary evaporator to a highly viscous solution (approx. 10 mL), which was then precipitated by pipette addition to a stirred methanol solution (1 L). Subsequently, the methanol solution was discarded and the precipitated polymer at the bottom of the beaker was collected by extraction with dichloromethane. Then polymers were concentrated and dried in-vacuo to a constant weight, yielding (6.90 g, 69% yield) of lignin-g-PLA copolymer. The PLA chain length average was determined by $^1H$-NMR ($CDCl_3$) end-group integration of the PLA (5.16 ppm) methide proton against the end-group methide proton (4.35 ppm) (FIG. 1, $M_n$~1800 Da). The purified lignin-g-PLA (10/90) copolymer was further characterized by $^{31}P$-NMR (FIG. 8), DSC (FIG. 11), and SEC (Table 1 and FIG. 10(b)). The theoretical $M_n$ value for PLA chains in FIG. 13 was calculated by dividing the mmoles of lactide by mmoles lignin-OH functionality (obtained by $^{31}P$-NMR analysis). This maximum $M_n$ for grafted PLA chains was then multiplied by the observed conversion of lactide in the grafting reaction.

The lignin-g-PLA copolymers (30-50 wt. % lignin) were synthesized as above, but were instead purified by dialysis (MW cutoff 1,000 Da) over methanol (1 L), changed twice over 12 h. The remaining contents of the dialysis bag were extracted with dichloromethane and concentrated in vacuo, yielding the copolymers.

Example 2

Acetylation of Lignin (DA=75%)

To 1.0 g of lignin was added acetic anhydride ($Ac_2O$, 2.6 mL, 28.0 mmole, 5.5 eq, based on 5.10 mmole OH/g lignin) and diluted to a final volume of 4.0 mL using p-dioxane in a 7 mL scintillation glass vial equipped with a stir bar. The reaction mixture was stirred at 50° C. for 2 h. No special care was taken to ensure that the reaction was moisture- or air-free. Acetylated lignin was recovered by precipitation initiated by addition of 45 mL of deionized (DI) water to the crude reaction mixture. The resulting suspension was transferred to a 50 mL falcon tube and subjected to centrifugation at 4000×g for 15 min. The supernatant was decanted and discarded. The residue was re-suspended in an additional 45 mL of DI water, and subjected to another round of centrifugation. After 2 rounds of centrifugation, the resulting product was freeze-dried, followed by drying in a vacuum oven (50° C.) prior to subsequent analyses and used as a substrate for co-polymerization with L-lactide. $^{31}P$-NMR analysis revealed 75% degree of acetylation (DA).

Example 3

Synthesis of a Thermoset Polymer

Thermoset materials were synthesized by adding a cross-linker (such as hexamethylene diisocyanate), directly to the crude melt after complete graft polymerization or from the isolated graft copolymers. After about 30 seconds to 1 minute of curing at 130° C., the mixture completely solidified. For example, synthesis of a thermoset polymer is schematically shown below.

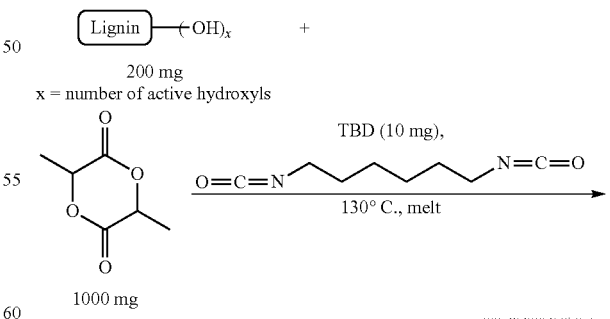

Thermoset polymers

Example 4

Mechanical Properties of PLA-Lignin Composites 2.1 g PLA was blended with non-modified lignin (0.021-0.105 g) or lignin-g-PLA copolymer (0.21-0.2625 g) in chloroform (15 mL) at room temperature for 15 h. Then, the polymer mixture was precipitated by the addition of isopropanol (100 mL). The precipitated polymers were dried in a vacuum oven (80° C.) for 3 days prior to use. PLA-lignin composites were obtained by hot pressing the dried precipitate (PHI-Tulip Model 225H-X6-13, USA) at 190° C. using three pressure stages: 0 ton pressure for 30 sec, 0.1 ton for 1 min, and then 0.5 ton for 2 min. The hot-pressed specimen (about 60×100×0.25 mm) was then cut into sample strips (10×100 mm) using a razor blade for tensile testing. Tensile tests were carried out using Instron 5565 (TA Instruments) to measure tensile modulus, strength, and strain of composites. The space between the grips was 50 mm and served as the gage length for deformation measurements. A constant deformation speed of 5 mm/min was used. The specimens were conditioned at room temperature under 54% relative humidity (RH) for 2 days prior to testing. Four to five replicate specimens were tested.

Example 5

Optical Properties of PLA-Lignin Composites

PLA (500 mg) was blended with unmodified lignin (5 mg) or lignin-g-PLA copolymer (50 mg) in chloroform (10 mL) at room temperature for 2 h. Then, the polymer mixture was precipitated by adding methanol (100 mL) and dried in a vacuum oven (55° C.) prior to use. 50 mg of PLA-lignin blends were then hot pressed at 180° C. using three pressure stages: 0 ton pressure for 30 sec, 0.1 ton for 1 min, and then 0.5 ton for 2 min into films with 0.04-0.05 mm in thickness. The films were conditioned at room temperature under 0% RH for 3 days prior to testing. PET was obtained from PET bottles and hot pressed by the procedure described above into films of 0.04 mm thickness. Optical properties of PLA, PLA-lignin, and PET films were measured by an Agilent Cary 6000i UV/Vis/NIR spectrophotometer. The specimens were scanned from 200 nm to 800 nm at room temperature.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit and scope of the invention. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

The invention claimed is:

1. A process of preparing a graft polymer comprising lignin and poly(lactic acid) (lignin-g-PLA copolymer), the process comprising reacting a lignin with a lactide and an organic base to provide the lignin-g-PLA copolymer, wherein the organic base is of formula:

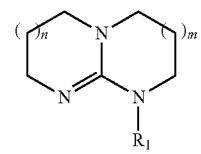

wherein
m is 0, 1, 2, or 3; n is 0, 1, 2, or 3; and $R_1$ is $C_1$-$C_6$ alkyl optionally substituted with 1-3 hydroxy, aryl, or $C_1$-$C_6$ alkoxy groups.

2. The process of claim 1, which is performed in the absence of a Lewis acid metal catalyst.

3. The process of claim 1, wherein the lactide is D-lactide, L-lactide, DL-lactide, or a mixture of 2 or more thereof.

4. The process of claim 1, which is performed at about 100° C. to about 140° C.

5. The process of claim 1, where the lignin-g-PLA copolymer comprises by weight about 1% to about 50% lignin.

6. The process of claim 1, wherein the lignin-g-PLA copolymer has a number average molecular weight of about 1000 Da to about 100,000 Da.

7. The process of claim 1, wherein the poly(lactic acid) chain length on the lignin-g-PLA copolymer has a degree of polymerization of about 2 to about 240.

8. The process of claim 1, further comprising reacting the lignin with a second co-monomer selected from caprolactone and other cyclic lactone and carbonate monomers.

9. The process of claim 1, wherein the lignin-g-PLA copolymer comprises about 0.15-about 1.10 mmole/g of aliphatic hydroxy groups.

10. The process of claim 1, wherein the lignin is partially acylated, and the lignin-g-PLA copolymer comprises about 0.1-about 0.2 mmole/g of aliphatic hydroxy groups.

11. The process of claim 1, further comprising reacting the lignin-g-PLA copolymer with a crosslinker to provide a thermoset polymer.

12. The process of claim 11, wherein the crosslinker is of formula OCN-L-NCO, wherein L is a $C_2$-$C_{20}$ alkylene or heteroalkylene optionally substituted with 1-5 $C_1$-$C_6$ alkyl groups, or L is a bivalent aromatic group or a linker containing a bivalent aromatic group.

13. The process of claim 12, wherein L is selected from —$(CH_2)_6$—, di-epoxides and polyanhydrides.

14. The lignin-g-PLA copolymer prepared by the process of claim 1.

15. The thermoset polymer prepared by the process of claim 11.

16. The lignin-g-PLA copolymer of claim 14 admixed to form a blend with a thermoplastic polymer.

17. An article of manufacture comprising the lignin-g-PLA copolymer of claim 14 which is:
a packaging material for light-sensitive products, ornamental flowers, and plants;
a mobile phone case;
a mulch film for weed control, increased soil temperature, and moisture retention;
an ultraviolet blocking material for sunglasses and windows;
a colorant or a coating material for paper;
an ultraviolet-resistant roof shingle, tile, or container;
a coating material; or
an adhesive.

18. The process of claim 1, wherein the lignin is partially acetylated.

19. The process of claim 1, wherein the lignin is partially acylated, and the lignin-g-PLA copolymer comprises up to about 0.1 mmole/g of COOH groups.

* * * * *